(12) United States Patent
McGuire et al.

(10) Patent No.: US 9,970,303 B2
(45) Date of Patent: May 15, 2018

(54) EROSION PROTECTION SLEEVE

(71) Applicant: ENTROTECH, INC., Columbus, OH (US)

(72) Inventors: James E. McGuire, Tiburon, CA (US); Andrew C. Strange, Worthington, OH (US)

(73) Assignee: ENTROTECH, INC., Columbus, OH (US)

( * ) Notice: Subject to any disclaimer, the term of this patent is extended or adjusted under 35 U.S.C. 154(b) by 379 days.

(21) Appl. No.: 14/711,683

(22) Filed: May 13, 2015

(65) Prior Publication Data

US 2015/0330231 A1 Nov. 19, 2015

Related U.S. Application Data

(60) Provisional application No. 61/992,636, filed on May 13, 2014.

(51) Int. Cl.
*B64C 1/10* (2006.01)
*F01D 5/28* (2006.01)
(Continued)

(52) U.S. Cl.
CPC .............. *F01D 5/28* (2013.01); *B64C 11/205* (2013.01); *B64C 27/33* (2013.01); *B64C 27/473* (2013.01); *Y10T 428/139* (2015.01)

(58) Field of Classification Search
CPC ....... F01D 5/28; B64C 27/473; B64C 11/205; B64C 2027/4736; B64C 27/33; B64C 27/04
See application file for complete search history.

(56) References Cited

U.S. PATENT DOCUMENTS

| 1,504,736 A | 8/1924 | Brown |
| 1,612,267 A | 12/1926 | Dickson |

(Continued)

FOREIGN PATENT DOCUMENTS

| EP | 51935 B1 | 11/1986 |
| EP | 359532 B1 | 10/1995 |

(Continued)

OTHER PUBLICATIONS

Lendlein et al.; Shape-Memory Polymers; Angew. Chem. Int. Ed. 2002; 41(12); pp. 2034-2057; Jun. 17, 2002.

*Primary Examiner* — Assres H Woldemaryam
(74) *Attorney, Agent, or Firm* — Shay Glenn LLP

(57) ABSTRACT

Described are articles, materials, and methods for protecting moving parts from degradation, such as protecting an airfoil or hydrofoil from erosion forces caused by air, sand, water, or wind. Described are foil-shaped erosion-resistant sleeves for protecting a foil. The sleeves may have a body with an outer surface, an inner surface, a thickness, a longitudinal dimension with a first end and a second end, and a dimension transverse to the longitudinal dimension, and the outer surface may include a shape-memory polymer or an elastomeric polymer with a materially continuous perimeter circumscribing the body around the transverse dimension, and an opening at the first end of the body adapted to receive the foil. Some erosion-resistant sleeves may be installed on a foil by inserting the foil into the sleeve through an opening in the sleeve, contracting the sleeve around the foil, and conforming the sleeve around the foil.

21 Claims, 14 Drawing Sheets

(51) Int. Cl.
  B64C 27/473 (2006.01)
  B64C 27/33 (2006.01)
  B64C 11/20 (2006.01)

(56) References Cited

U.S. PATENT DOCUMENTS

| | | |
|---|---|---|
| 2,823,672 A | 2/1958 | Schladermundt et al. |
| 3,699,623 A | 10/1972 | Kreider |
| 4,310,509 A | 1/1982 | Berglund et al. |
| 4,318,672 A | 3/1982 | Hansen |
| 4,340,043 A | 7/1982 | Seymour |
| 4,370,981 A | 2/1983 | Sanderson |
| 4,372,303 A | 2/1983 | Grossmann et al. |
| 4,413,621 A | 11/1983 | McCracken et al. |
| 4,460,369 A | 7/1984 | Seymour |
| 4,565,495 A | 1/1986 | Macleod, Jr. |
| 4,580,944 A | 4/1986 | Miller |
| 4,643,180 A | 2/1987 | Feld et al. |
| 4,753,232 A | 6/1988 | Ward |
| 4,842,663 A | 6/1989 | Kramer |
| 4,884,563 A | 12/1989 | Sessions |
| 4,935,277 A | 6/1990 | Le Balc'h |
| 4,948,859 A | 8/1990 | Echols et al. |
| 4,990,144 A | 2/1991 | Blott |
| 4,999,210 A | 3/1991 | Solomon et al. |
| 5,013,306 A | 5/1991 | Solomon et al. |
| 5,017,625 A | 5/1991 | Ansell |
| 5,019,096 A | 5/1991 | Fox, Jr. et al. |
| 5,031,245 A | 7/1991 | Milner |
| 5,059,186 A | 10/1991 | Yamamoto et al. |
| 5,059,189 A | 10/1991 | Cilento et al. |
| 5,069,907 A | 12/1991 | Mixon et al. |
| 5,087,686 A | 2/1992 | Ansell et al. |
| 5,098,037 A | 3/1992 | Leffel et al. |
| 5,098,417 A | 3/1992 | Yamazaki et al. |
| 5,123,814 A | 6/1992 | Burdick et al. |
| 5,147,338 A | 9/1992 | Lang et al. |
| 5,183,664 A | 2/1993 | Ansell |
| 5,260,066 A | 11/1993 | Wood et al. |
| 5,270,358 A | 12/1993 | Asmus |
| 5,322,695 A | 6/1994 | Shah et al. |
| 5,328,450 A | 7/1994 | Smith et al. |
| 5,334,388 A | 8/1994 | Hoang et al. |
| 5,344,235 A | 9/1994 | Weetman et al. |
| 5,383,476 A | 1/1995 | Peimer et al. |
| 5,384,174 A | 1/1995 | Ward et al. |
| 5,441,741 A | 8/1995 | Cheong |
| 5,445,604 A | 8/1995 | Lang |
| 5,486,096 A | 1/1996 | Hertel et al. |
| 5,518,730 A | 5/1996 | Fuisz |
| 5,544,845 A | 8/1996 | Giamati et al. |
| 5,547,662 A | 8/1996 | Khan et al. |
| 5,614,310 A | 3/1997 | Delgado et al. |
| 5,648,167 A | 7/1997 | Peck |
| 5,656,364 A | 8/1997 | Rickerby et al. |
| 5,667,889 A | 9/1997 | Katsura et al. |
| 5,690,955 A | 11/1997 | Griffiths et al. |
| 5,708,023 A | 1/1998 | Modak et al. |
| 5,711,935 A | 1/1998 | Hill et al. |
| 5,717,005 A | 2/1998 | Richardson |
| 5,720,597 A * | 2/1998 | Wang .............. F01D 5/147 416/229 A |
| 5,743,494 A | 4/1998 | Giamati et al. |
| 5,753,246 A | 5/1998 | Peters |
| 5,763,412 A | 6/1998 | Khan et al. |
| 5,772,640 A | 6/1998 | Modak et al. |
| 5,803,086 A | 9/1998 | Scholz et al. |
| 5,829,442 A | 11/1998 | Cox et al. |
| 5,833,665 A | 11/1998 | Bootman et al. |
| 5,855,208 A | 1/1999 | Askill et al. |
| 5,856,248 A | 1/1999 | Weinberg |
| 5,910,370 A | 6/1999 | Katsura et al. |
| 5,922,313 A | 7/1999 | Steward et al. |
| 5,942,239 A | 8/1999 | Huprich et al. |
| 5,965,256 A | 10/1999 | Barrera |
| 5,965,276 A | 10/1999 | Shlenker et al. |
| 5,965,610 A | 10/1999 | Modak et al. |
| 5,979,450 A | 11/1999 | Baker et al. |
| 5,985,395 A | 11/1999 | Comstock et al. |
| 6,030,633 A | 2/2000 | Hemling et al. |
| 6,071,447 A | 6/2000 | Bootman et al. |
| 6,093,414 A | 7/2000 | Capelli |
| 6,110,292 A | 8/2000 | Jewett et al. |
| 6,125,850 A | 10/2000 | Sokal et al. |
| 6,187,290 B1 | 2/2001 | Gilchrist et al. |
| 6,198,016 B1 | 3/2001 | Lucast et al. |
| 6,224,579 B1 | 5/2001 | Modak et al. |
| 6,251,423 B1 | 6/2001 | Bradford |
| 6,265,057 B1 | 7/2001 | Giamati |
| 6,352,601 B1 | 3/2002 | Ray |
| 6,422,778 B2 | 7/2002 | Baumann et al. |
| 6,435,873 B1 | 8/2002 | Burgio |
| 6,458,341 B1 | 10/2002 | Rozzi et al. |
| 6,461,467 B2 | 10/2002 | Blatchford et al. |
| 6,489,024 B2 | 12/2002 | Griffith, Jr. et al. |
| 6,534,069 B1 | 3/2003 | Asmus et al. |
| 6,582,711 B1 | 6/2003 | Asmus et al. |
| 6,582,719 B2 | 6/2003 | Modak et al. |
| 6,585,967 B2 | 7/2003 | Narang et al. |
| 6,585,997 B2 | 7/2003 | Moro et al. |
| 6,599,525 B2 | 7/2003 | Scamilla Aledo et al. |
| 6,605,666 B1 | 8/2003 | Scholz et al. |
| 6,617,294 B2 | 9/2003 | Narula et al. |
| 6,673,054 B1 | 1/2004 | Gould et al. |
| 6,706,024 B2 | 3/2004 | Modak et al. |
| 6,746,667 B2 | 6/2004 | Badejo et al. |
| 6,830,758 B2 | 12/2004 | Nichols et al. |
| 6,838,078 B2 | 1/2005 | Wang et al. |
| 6,902,740 B2 | 6/2005 | Schaberg et al. |
| 6,942,875 B2 | 9/2005 | Hedgpeth |
| 6,960,065 B2 | 11/2005 | Leach |
| 7,005,031 B2 | 2/2006 | Lucast et al. |
| 7,030,203 B2 | 4/2006 | Mosbey et al. |
| 7,078,582 B2 | 7/2006 | Stebbings et al. |
| 7,137,968 B1 | 11/2006 | Burrell et al. |
| 7,237,751 B2 | 7/2007 | Anning |
| 7,261,701 B2 | 8/2007 | Davis et al. |
| 7,265,257 B2 | 9/2007 | Baldwin et al. |
| 7,329,412 B2 | 2/2008 | Modak et al. |
| 7,334,759 B2 | 2/2008 | Castillo et al. |
| 7,374,404 B2 | 5/2008 | Schilling |
| 7,408,604 B2 | 8/2008 | Takada et al. |
| 7,488,757 B2 | 2/2009 | Hoang et al. |
| 7,537,779 B2 | 5/2009 | Modak et al. |
| 7,538,257 B2 | 5/2009 | Addison et al. |
| 7,576,256 B2 | 8/2009 | Björnberg et al. |
| 7,612,248 B2 | 11/2009 | Burton et al. |
| 7,642,397 B2 | 1/2010 | Cohen et al. |
| 7,651,661 B2 | 1/2010 | Raad et al. |
| 7,651,990 B2 | 1/2010 | Asmus |
| 7,670,967 B2 | 3/2010 | Runge et al. |
| 7,732,655 B2 | 6/2010 | Cullen et al. |
| 7,736,745 B2 | 6/2010 | Hong |
| 7,772,454 B2 | 8/2010 | Addison et al. |
| 7,824,122 B2 | 11/2010 | Flores et al. |
| 7,914,888 B2 | 3/2011 | Hartman et al. |
| 7,968,977 B2 | 6/2011 | Seo et al. |
| 7,988,673 B2 | 8/2011 | Wright et al. |
| 7,998,393 B2 * | 8/2011 | Mitchell ............. F01D 5/282 264/257 |
| 8,096,508 B2 | 1/2012 | Marx et al. |
| 8,097,272 B2 | 1/2012 | Addison |
| 8,105,306 B2 | 1/2012 | Davis et al. |
| 8,137,735 B2 | 3/2012 | Wang et al. |
| 8,153,741 B2 | 4/2012 | Stopek |
| 8,207,148 B2 | 6/2012 | Modak et al. |
| 8,657,581 B2 * | 2/2014 | Pilpel ............... F03D 3/062 415/4.1 |
| 2002/0015726 A1 | 2/2002 | Scamilla Aledo et al. |
| 2002/0054910 A1 | 5/2002 | Ronchi et al. |
| 2002/0187181 A1 | 12/2002 | Godbey et al. |
| 2003/0004449 A1 | 1/2003 | Lafratta et al. |
| 2003/0147925 A1 | 8/2003 | Sawan et al. |
| 2003/0175328 A1 | 9/2003 | Shefer et al. |

(56) References Cited

U.S. PATENT DOCUMENTS

| | | |
|---|---|---|
| 2003/0175333 A1 | 9/2003 | Shefer et al. |
| 2003/0198692 A1 | 10/2003 | Holmstrom et al. |
| 2003/0211066 A1 | 11/2003 | Scholz et al. |
| 2004/0002675 A1 | 1/2004 | Nierle et al. |
| 2004/0024448 A1 | 2/2004 | Chang et al. |
| 2004/0133141 A1 | 7/2004 | Kiel et al. |
| 2004/0142019 A1 | 7/2004 | Serafica et al. |
| 2004/0208908 A1 | 10/2004 | Modak et al. |
| 2004/0247655 A1 | 12/2004 | Asmus et al. |
| 2005/0112151 A1 | 5/2005 | Horng |
| 2005/0249791 A1 | 11/2005 | Hobbs et al. |
| 2005/0283050 A1 | 12/2005 | Gundlapalli et al. |
| 2006/0034899 A1 | 2/2006 | Ylitalo et al. |
| 2006/0051385 A1 | 3/2006 | Scholz |
| 2006/0068013 A1 | 3/2006 | Ditizio et al. |
| 2006/0099237 A1 | 5/2006 | Modak et al. |
| 2006/0141015 A1 | 6/2006 | Tessier et al. |
| 2006/0141017 A1 | 6/2006 | Kling et al. |
| 2007/0020320 A1 | 1/2007 | David et al. |
| 2007/0036846 A1 | 2/2007 | Tsang |
| 2007/0048251 A1 | 3/2007 | Arthur |
| 2007/0048345 A1 | 3/2007 | Huang et al. |
| 2007/0138439 A1 | 6/2007 | Asmus et al. |
| 2007/0147946 A1 | 6/2007 | Cybulski et al. |
| 2007/0148215 A1 | 6/2007 | Teslenko et al. |
| 2007/0207189 A1 | 9/2007 | Belcheva et al. |
| 2007/0231569 A1 | 10/2007 | Tanaka et al. |
| 2007/0253909 A1 | 11/2007 | Magallon et al. |
| 2007/0254854 A1 | 11/2007 | Magallon et al. |
| 2008/0026015 A1 | 1/2008 | Macdonald et al. |
| 2008/0078413 A1 | 4/2008 | Padget et al. |
| 2008/0081020 A1 | 4/2008 | Huang et al. |
| 2008/0082038 A1 | 4/2008 | Johnson et al. |
| 2008/0142023 A1 | 6/2008 | Schmid et al. |
| 2008/0159870 A1* | 7/2008 | Hong .................... B64F 5/40 416/224 |
| 2008/0181936 A1 | 7/2008 | Filatov et al. |
| 2008/0195016 A1 | 8/2008 | Bottini |
| 2009/0029961 A1 | 1/2009 | Modak et al. |
| 2009/0130187 A1 | 5/2009 | Volpato et al. |
| 2009/0156563 A1 | 6/2009 | Baschong et al. |
| 2009/0187130 A1 | 7/2009 | Asmus et al. |
| 2009/0216169 A1 | 8/2009 | Hansen et al. |
| 2009/0226541 A1 | 9/2009 | Scholz et al. |
| 2010/0003198 A1 | 1/2010 | Stolmeier et al. |
| 2010/0035997 A1 | 2/2010 | Broadley et al. |
| 2010/0062974 A1 | 3/2010 | Laronde et al. |
| 2010/0087788 A1 | 4/2010 | Rosenblatt et al. |
| 2010/0092530 A1 | 4/2010 | Stopek et al. |
| 2010/0106103 A1 | 4/2010 | Ziebol et al. |
| 2010/0196504 A1 | 8/2010 | Schmaus et al. |
| 2010/0226943 A1 | 9/2010 | Brennan et al. |
| 2010/0234815 A1 | 9/2010 | Do et al. |
| 2010/0282409 A1 | 11/2010 | Hobbs et al. |
| 2010/0286641 A1 | 11/2010 | Yao et al. |
| 2010/0318052 A1 | 12/2010 | Ha et al. |
| 2011/0008402 A1 | 1/2011 | Madhyastha et al. |
| 2011/0009831 A1 | 1/2011 | Burkholz et al. |
| 2011/0076321 A1 | 3/2011 | Woeller et al. |
| 2011/0086078 A1 | 4/2011 | Gooch et al. |
| 2011/0097402 A1 | 4/2011 | Ditizio et al. |
| 2011/0100293 A1 | 5/2011 | Abbasian et al. |
| 2011/0104246 A1 | 5/2011 | Rogosnitzky |
| 2011/0117032 A1 | 5/2011 | Gilding |
| 2011/0146680 A1 | 6/2011 | Conway |
| 2011/0166492 A1 | 7/2011 | Holm et al. |
| 2011/0229531 A1 | 9/2011 | Henriquez et al. |
| 2011/0236433 A1 | 9/2011 | Hardy et al. |
| 2011/0251566 A1 | 10/2011 | Zimnitsky et al. |
| 2011/0256185 A1 | 10/2011 | Yang et al. |
| 2011/0274770 A1 | 11/2011 | Scholz et al. |
| 2011/0290259 A1 | 12/2011 | McGuire, Jr. et al. |
| 2011/0313048 A1 | 12/2011 | Yang et al. |
| 2012/0034094 A1 | 2/2012 | Wansink |
| 2012/0046587 A1 | 2/2012 | Wild et al. |
| 2012/0052292 A1 | 3/2012 | Pulapura et al. |
| 2012/0059300 A1 | 3/2012 | Ovington |
| 2012/0078155 A1 | 3/2012 | Bowman et al. |
| 2012/0167352 A1* | 7/2012 | Beasley .................... B25B 9/00 24/302 |
| 2012/0178731 A1 | 7/2012 | Guthery |
| 2016/0009034 A1* | 1/2016 | Moors .................... B29C 70/48 264/511 |

FOREIGN PATENT DOCUMENTS

| | | |
|---|---|---|
| EP | 1695820 B1 | 6/2011 |
| GB | 2047188 A | 11/1980 |
| GB | 2239181 A | 6/1991 |
| WO | WO91/09633 A1 | 7/1991 |
| WO | WO91/19470 A1 | 12/1991 |
| WO | WO93/00118 A1 | 1/1993 |
| WO | WO93/02717 A1 | 2/1993 |
| WO | WO94/00164 A1 | 1/1994 |
| WO | WO95/26134 A1 | 10/1995 |
| WO | WO96/13284 A1 | 5/1996 |
| WO | WO97/02038 A1 | 1/1997 |
| WO | WO97/35627 A1 | 10/1997 |
| WO | WO97/49383 A1 | 12/1997 |
| WO | WO98/06260 A1 | 2/1998 |
| WO | WO98/20916 A1 | 5/1998 |
| WO | WO98/35709 A1 | 8/1998 |
| WO | WO98/44962 A1 | 10/1998 |
| WO | WO99/29173 A1 | 6/1999 |
| WO | WO00/15036 A1 | 3/2000 |
| WO | WO00/30694 A1 | 6/2000 |
| WO | WO01/22975 A1 | 4/2001 |
| WO | WO02/060501 A2 | 8/2002 |
| WO | WO02/102418 A2 | 12/2002 |
| WO | WO03/061538 A1 | 7/2003 |
| WO | WO03/075968 A2 | 9/2003 |
| WO | WO2004/024196 A1 | 3/2004 |
| WO | WO2004/060330 A2 | 7/2004 |
| WO | WO2004/064880 A1 | 8/2004 |
| WO | WO2004/099320 A2 | 11/2004 |
| WO | WO2005/058199 A1 | 6/2005 |
| WO | WO2005/099808 A1 | 10/2005 |
| WO | WO2005/104842 A1 | 11/2005 |
| WO | WO2006/017245 A2 | 2/2006 |
| WO | WO2006/020584 A2 | 2/2006 |
| WO | WO2006/029255 A2 | 3/2006 |
| WO | WO2006/071849 A1 | 7/2006 |
| WO | WO2007/011612 A2 | 1/2007 |
| WO | WO2007/027898 A2 | 3/2007 |
| WO | WO2007/100881 A2 | 9/2007 |
| WO | WO2007/142629 A1 | 12/2007 |
| WO | WO2008/051629 A2 | 5/2008 |
| WO | WO2008/057773 A2 | 5/2008 |
| WO | WO2008/141416 A1 | 11/2008 |
| WO | WO2008/157013 A1 | 12/2008 |
| WO | WO2009/023424 A2 | 2/2009 |
| WO | WO2009/064412 A1 | 5/2009 |
| WO | WO2009/091682 A2 | 7/2009 |
| WO | WO2009/100341 A1 | 8/2009 |
| WO | WO2009/124100 A1 | 10/2009 |
| WO | WO2009/124386 A1 | 10/2009 |
| WO | WO2009/129630 A1 | 10/2009 |
| WO | WO2010/005378 A1 | 1/2010 |
| WO | WO2010/010345 A2 | 1/2010 |
| WO | WO2010/147930 A1 | 12/2010 |
| WO | WO2011/009083 A1 | 1/2011 |
| WO | WO2011/047118 A1 | 4/2011 |
| WO | WO2011/076216 A2 | 6/2011 |
| WO | WO2011/081520 A1 | 7/2011 |
| WO | WO2011/089379 A2 | 7/2011 |
| WO | WO2011/119517 A2 | 9/2011 |
| WO | WO2011/127591 A1 | 10/2011 |
| WO | WO2011/129982 A2 | 10/2011 |
| WO | WO2011/156910 A2 | 12/2011 |
| WO | WO2012/007929 A1 | 1/2012 |
| WO | WO2012/027566 A2 | 3/2012 |
| WO | WO2012/030823 A1 | 3/2012 |
| WO | WO2012/031095 A1 | 3/2012 |

(56) References Cited

FOREIGN PATENT DOCUMENTS

| WO | WO2012/031168 A1 | 3/2012 |
|---|---|---|
| WO | WO2012/094009 A2 | 7/2012 |
| WO | WO2012/100244 A2 | 7/2012 |

* cited by examiner

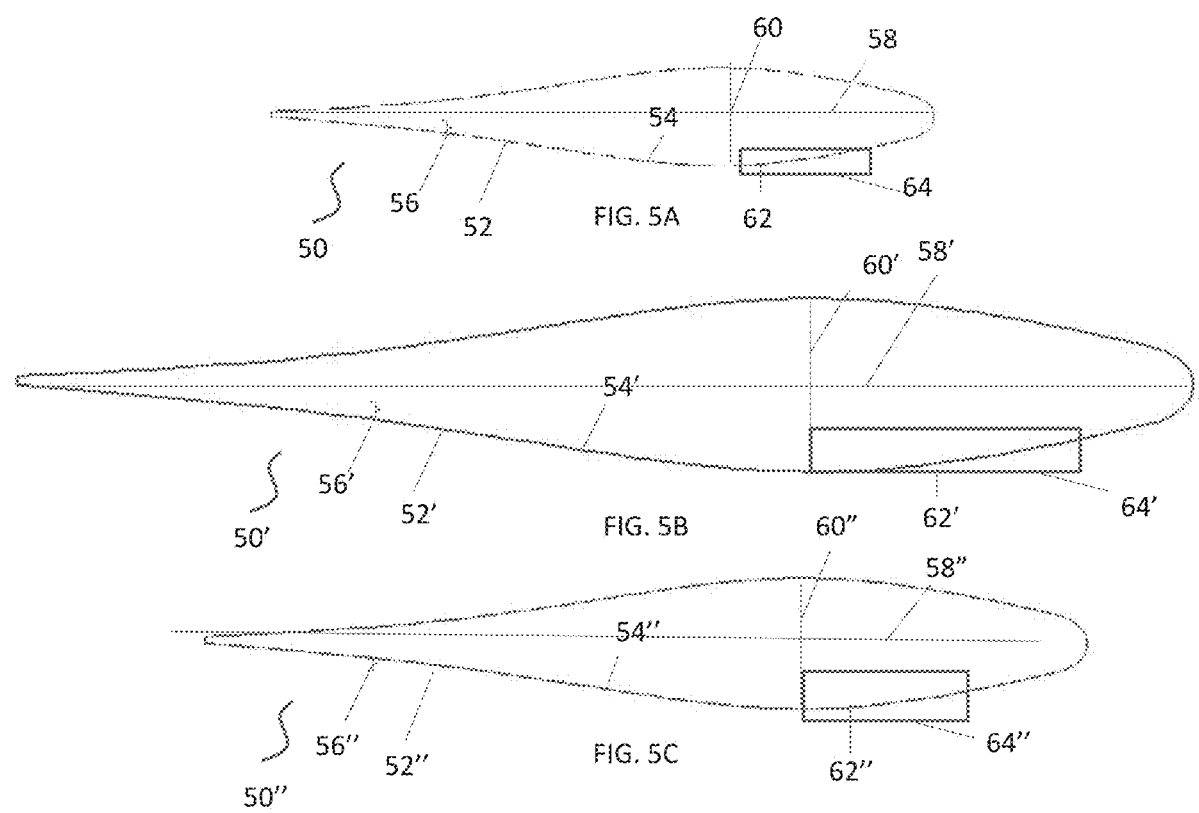

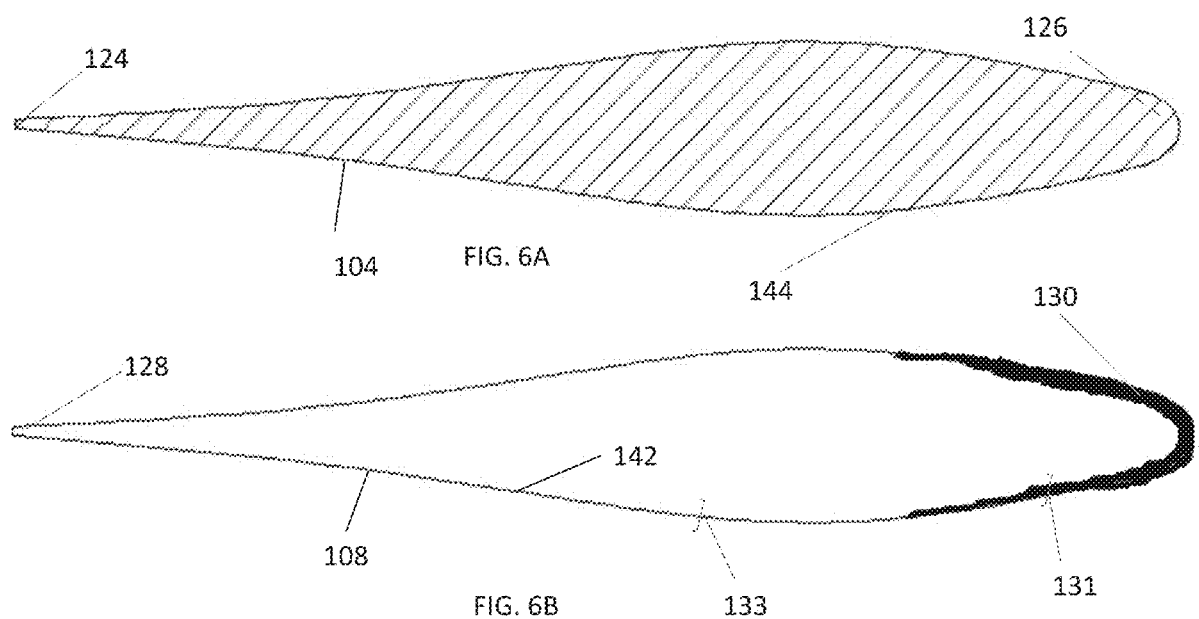

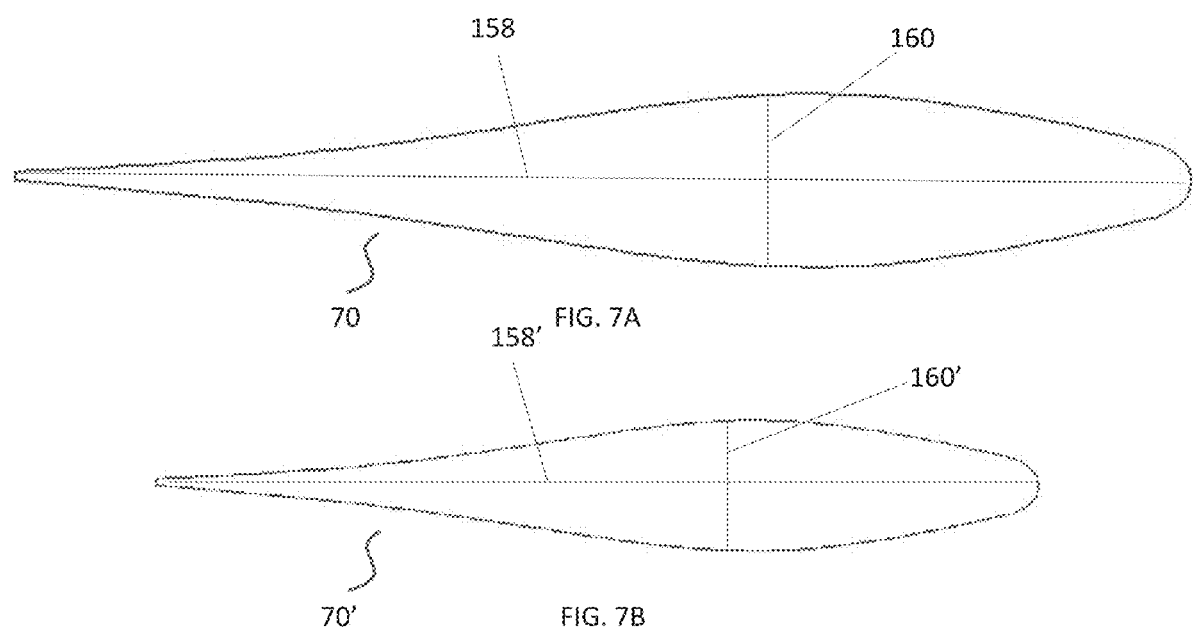

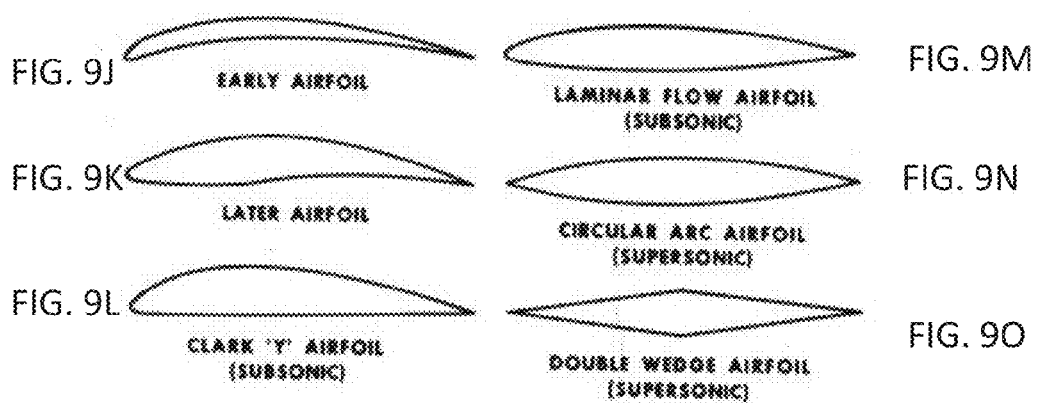
FIG. 9J EARLY AIRFOIL
FIG. 9K LATER AIRFOIL
FIG. 9L CLARK 'Y' AIRFOIL (SUBSONIC)
FIG. 9M LAMINAR FLOW AIRFOIL (SUBSONIC)
FIG. 9N CIRCULAR ARC AIRFOIL (SUPERSONIC)
FIG. 9O DOUBLE WEDGE AIRFOIL (SUPERSONIC)

Low-speed ULM (1 m)

Propeller blade (15 cm)

Blackbird (6 cm)

Dragonfly wing (12 mm)

Dolphin flipper fin (10 cm)

Airliner (8 m) FIG. 9U

Supersonic interceptor (2 m) FIG. 9V

Turbofan fan blade (80 cm) FIG. 9W

Turbine blade (8 cm) FIG. 9X

Sailboat (3 m) FIG. 9Y

FIG. 9 P-X

EROSION PROTECTION SLEEVE

CROSS REFERENCE TO RELATED APPLICATIONS

This application claims the benefit of U.S. Provisional Application No. 61/992,636, filed May 13, 2014, which application is incorporated by reference herein.

INCORPORATION BY REFERENCE

All publications and patent applications mentioned in this specification are herein incorporated by reference to the same extent as if each individual publication or patent application was specifically and individually indicated to be incorporated by reference.

FIELD

The present invention pertains to articles, materials, and methods for protecting objects from degradation, such as protecting an airfoil or hydrofoil from erosion forces caused by sand, sun, water, or wind.

BACKGROUND

Erosion is the process by which the surface of an object is worn away over time. The forces of erosion, such as those caused by sand, sun, water, and wind, can destroy the object. Airplane wings, helicopter rotor blades, boat hydrofoils and other foils experience especially strong erosion forces due to their movement through air or water. Erosion of these foils is a vexing and costly problem since damaged foils do not perform properly, and fixing or replacing them can be expensive and result in significant down time. It is difficult to predict the lifetime of a foil or when a foil should be replaced as different environments have significantly different effects on the erosion rates.

Various products have been developed that attempt to protect a foil surface from erosion forces, but these products suffer various limitations. Some commonly used current solutions, such as protective tape and protective boots (both available from 3M) are put on an airfoil surface to provide a barrier to erosion forces. A protective tape for an airfoil is generally a relatively thin, flexible material with a short, finite length (e.g., shaped like wide Scotch® tape) that is placed over part of a foil and held in place by an adhesive between the tape and the foil. Portions of the tape may sometimes be overlapped in order to adequately cover the surface. A boot has typically been preformed from a sheet of material into a specially shaped appliqué to fit specifically over part of the foil surface. Similar to the tape, it is generally held onto the airfoil surface with an adhesive. A protective tape or protective boot is typically applied to the leading edge of the airfoil, which experiences the most severe abrasive and wind forces, and extends partway along of the top side and bottom side of the airfoil. Commonly used adhesives for holding boots and tapes in place include pressure sensitive adhesives (PSA) and two-part epoxies. These boots, tapes and adhesives have various drawbacks.

The utility of boots and tapes is subject to the quality of application or installation and great care must be taken in preparing and installing them. Boots and tape can be dangerously unreliable if not installed properly. The usefulness of these products is very dependent on the nature of the substrate (the surface of the airfoil), to which they are applied. Different substrates (different surfaces of helicopter blades or airplane wings) have different inherent surface properties and have to be handled accordingly. A boot or tape requires a very clean surface in order to stick to a surface, and it may be difficult to get the surface sufficiently clean. Even small amounts of coatings or contaminants on a surface (especially near a tape or boot edge) can prevent proper adherence. A helicopter blade or airplane wing surface may have paint or another slippery coating or paint or a residual contaminant (such as hydraulic fluid, lubricant, silicone oil, other oils, etc.) on it that would prevent the tape or boot from sticking to it. The blade or wing surface may need to be specially prepped and contaminants may need to be completely removed with special chemicals, cleaners, or treatments. Proper installation if a boot or tape may require special equipment and a controlled, clean environment. Even a relatively small area of a tape or boot that is not adhered may cause problems, particularly if the poor adherence occurs along a boot or tape edge or other high stress area. In addition to unclean or slippery areas, air bubbles may form during installation and prevent the boot or tape from sticking to the surface. Boot or tape installation that proceeds without proper surface preparation may cause boot or tape failure with disastrous results. Airfoils are subject to tremendous wind forces, and it is very dangerous if a protective material such as a boot or tape becomes loose and falls off mid-flight. Even beyond airfoil damage due to erosion, a boot or tape that falls even partially off a helicopter blade may get caught in or otherwise damage a helicopter rotor or tail rotor or even stop one of the rotors altogether, interrupting flight or even bringing down the entire helicopter.

Once in place, a boot or tape needs to not interfere with flight aerodynamics. In particular, tapes and boots need to fit closely on the airfoil during normal use and maintain the aerodynamic properties of the helicopter or airplane. Once a tape or boot is in place on a foil, the tape or boot material and the adhesive start to age. Adhesives are temperature dependent and decay over time, but it is difficult to predict exactly when that will be. Physical properties of an adhesive, such as peel strength and shear strength, are greatly affected by both hot and cold temperatures. Commercial and military aircraft are used in harsh environments all over the world and often operate at both ends of the temperature spectrum in a single day, subjecting the adhesives and protective materials to great stresses. Boots and tapes have edges (which are typically found on the trailing edge of a foil) that can disrupt airflow and change flight behavior. These edges are also vulnerable to getting pulled on and pried up by tremendous wind forces when an adhesive starts to fail, dislodging the boot or tape from the foil mid-flight. A whole section of tape or boot may be pulled away. Even detaching a small area of tape from a helicopter blade can lead to severe vibration and dangerous consequences for the helicopter and pilot. Tape that completely or partially detaches from a helicopter blade can becomes entangled in the helicopter tail rotor, and may cause a crash. In a combat situation, if the occupants are lucky enough to survive the crash, being stranded behind enemy lines is equally life threatening.

Boots and tapes wear out over time and can be difficult to remove and replace. As mentioned above, the quality of boot and tape installation is highly dependent on the airfoil surface and the quality and nature of the surface changes over time. An unprotected blade surface or a protective boot or tape on an airfoil is damaged by abrasion and wear from sand and pebbles, aging and regular use, corrosion from salt water, damage from weapons, oxidation damage, ultraviolet (UV) light damage from the sun, or weathering and cracking due to heat and cold exposure. A tape or boot may not fit well onto a damaged blade surface. The foil surface may have, in addition to coatings, paint, and contaminants that can interfere, bits of an old boot or tape stuck to it. Erosion may have left behind only adhesive or may have broken the tape or boot down into numerous small pieces of adhered film; these small bits can be very difficult to remove. For optimal performance, all of a used tape or boot has to be completely peeled off a blade before a new one is installed. Removal may require special equipment, specific cleaners, or a special (clean) environment. Cleaning all tape and residue from the surface may require use of a wallpaper streamer or a sander or other abrasive methods and the cleaning and sanding processes may further damage the blade. Relying on an adhesive to secure a protective layer to an airfoil is not an optimal solution.

Abrasion strips made of metal, such as nickel, stainless steel or titanium, are also sometimes used on helicopter blades to protect the blades from erosion. These are typically applied to the leading edge of an airfoil, generally covering the first 15% of the chord length on the top and bottom. In the highest wear areas, a metallic cap, such as electroformed nickel that is tapered to a thin trailing edge so as to reduce impact to airfoil performance is bonded on top of an abrasion strip. In addition to many of the problems described above with adhering boots and tapes to a foil, metallic abrasion strips are softer than sand, and when a helicopter blade is hit by sand, the sand can rapidly erode the metal strip. The erosion of these strips is especially noticeable on the outboard sections of the blade where tip velocity approaches Mach 1. Additionally, as documented during combat operations in Afghanistan, the erosion of a metal strip caused by powerful and rapidly moving sand can cause the formation of a visible halo or corona around the rotating helicopter blade. This corona effect, as it is called, is thought to occur due to static discharge or to the creation of a cloud of small metal particulates that ignite, causing a spontaneous and visible spark due to pyrophoric oxidation. The highly visible halo is spectacularly and undesirably visible in the dark at night as a large, bright circle. The corona effect makes the helicopter visible from a great distance which is particularly detrimental for a helicopter that needs to be stealthy.

Spray coatings are also sometimes used to protect helicopter blades. As with the tapes and boots, careful surface preparation is critical. A helicopter blade may need to be removed from the helicopter for spray coating installation and hung in a special spray booth. The blade has to be carefully cleaned in order for the spray coating to stick to the surface. A spray coating is generally applied to a blade in a liquid form in the spray booth. Areas of the blade that should not be coated have to be protected or masked to prevent coating. Multiple rounds of coating and drying are generally required. Special controls are required to ensure that the coating is applied with a uniform thickness. Once applied, these coatings may be thin and wear away quickly and need frequent replacement. They may provide inadequate protection against harsher environments or objects. Using such coatings reduces operational readiness and allows fewer missions to be run.

Thus there is need for improved methods to protect an airfoil, hydrofoil, or other foil and to extend the life of these foil surfaces. Provided herein are articles, materials, and methods for protecting moving parts from degradation, such as by protecting an airfoil or hydrofoil from erosion forces from sand, sun, water, or wind.

SUMMARY OF THE DISCLOSURE

The present invention relates to systems, articles, materials, and methods for protecting objects from degradation and particularly for protecting airfoils, hydrofoils, other foils, and foil shaped objects such as from airplane wings, boat hydrofoils, and helicopter blades from erosion forces such as sand, sun, water, or wind. In general, such systems may use a shapeable covering that has a continuous outer perimeter (e.g., without seams and without ends) that circumscribes (or is configured to circumscribe) and conforms to a surface of a foil. A shapeable covering may be a sleeve with an opening at one end and may fit (or be configured to fit) over a foil and change size to conform to the foil surface. The continuous perimeter may be hold the sleeve together and hold the sleeve on the foil. The sleeve may be mechanically interlocked and held onto the foil by forces between the sleeve and the foil (e.g., a compressive force, an interfacial force, static friction or friction, etc.). Part or all of a shapeable covering may change size to fit over a foil and may change size again to conform to the foil surface when over the foil. In some cases, a portion of a shapeable covering, such as a portion configured to fit over a concave portion of a foil, may not change size or shape while the rest of the sleeve does change size or shape. A shapeable covering may include a polymer, such as a shape-memory or elastomeric polymer, and may configured to expand in response to an applied force and to contract in response to removal of the applied force.

One aspect of the invention provides an erosion-resistant sleeve for protecting a foil, the foil including an airfoil or hydrofoil having a first foil shape, the sleeve including: a body adapted to cover at least a portion of the foil, the body comprising an outer surface and an inner surface and a sleeve thickness therebetween and having a longitudinal dimension with a first end and a second end and a dimension transverse to the longitudinal dimension, the outer surface comprising a shape memory polymer or an elastomeric polymer with a materially continuous perimeter circumscribing the body around the transverse dimension and having a second foil shape, the inner surface comprising a third foil shape that has the same shape as at least a portion of the first foil shape; and an opening at the first end of the body adapted to receive the foil.

In some embodiments the first and/or third foil shapes comprise a wing-like curvilinear foil shape or a double wedge foil shape. In some embodiments, the body is seamless. In some embodiments, the body is endless in the transverse dimension. In some embodiments, the body further includes an opening at a second end. In some embodiments, the body includes a concave portion. In some such embodiments, concave portion includes a non-shape memory material. In some embodiments, the first foil shape, the second foil shape, and/or the third foil shape are substantially the same and in some embodiments, they are different. In some embodiments, the sleeve having a third foil shape is adapted and configured to provide a lift force when the sleeve covers the foil and the foil moves relative to an air or water current. In some embodiments the foil includes a leading edge and a trailing edge and the sleeve is adapted to surround and cover the foil at a portion of the leading edge, a portion of the trailing edge, and an area between the edges. In some embodiments, the thickness varies from a first portion of the body to a second portion of the body. In some embodiments, the foil includes a rounded leading edge at the front of the foil and a trailing edge at the rear of the foil and the thickness is greater at the first portion corresponding to the rounded leading edge.

In some embodiments the foil and the inner surface of the body are substantially the same size and in some embodiments the inner surface of the body is smaller than the foil. In some embodiments, a transverse segment of the body is adapted to undergo a first expansion change from about 1% to about 75% in the transverse dimension. In some embodiments, a transverse segment of the body is adapted to undergo a first expansion change to provide between 0.010" and 0.25" of clearance between the inner surface of the body and the foil. In some embodiments, a transverse segment of the body is adapted to undergo a first contraction change from about 1% to about 75% in the transverse dimension. In some embodiments, a transverse segment of the sleeve is adapted to undergo a first contraction change to remove between 0.010" and 0.25" of clearance between the inner surface of the body and the foil when the sleeve is in place over the foil. In some embodiments, a transverse segment of the body is adapted to undergo a first expansion change in response to an expansion force to provide clearance between the inner surface of the sleeve and an outer surface of the foil, and to contract when the force is removed and thereby deliver a compressive force over the surface of the foil when the sleeve is in place over the foil.

In some embodiments, the outer surface of the body is substantially free of folds and wrinkles.

In some embodiments, the body includes a heat-responsive shape-memory polymer and the body is configured to undergo a shape-memory change in response to heat. In some embodiments, the sleeve includes a thermoplastic polyurethane material. In some embodiments, the sleeve has a shore hardness value from 60 A to 70 D. In some embodiments, the sleeve includes an aliphatic polyurethane with a durometer hardness around 60 Shore D. In some embodiments, the sleeve includes Tecoflex® (an aliphatic polyurethane with a durometer hardness around 93 Shore A). In some embodiments, the sleeve includes an aliphatic thermoplastic polyurethane including at least one of polycaprolactone and polycarbonate.

In some embodiments, the sleeve includes a plurality of layers. In some embodiments, the sleeve thickness is between 0.1 mil to 120 mil or between 0.3 mil to 30 mil.

In some embodiments, the sleeve includes a channel, hole, and/or wire through the body. In some embodiments, the sleeve includes an adhesive on the inner surface of the body and/or a coating on the outer surface of the body. In some embodiments, the sleeve includes a P-static dissipative material, a radar interference material, a radar reflective material, and/or a metal.

Another aspect of the invention provides an erosion-resistant stimulus responsive shape-memory polymer sleeve for protecting a foil having a first foil shape, the sleeve having a first configuration with a second foil shape and adapted to have an expanded second configuration and a contracted third configuration and including: a body having a longitudinal dimension with a first end and a second end and a dimension transverse to the longitudinal dimension; an opening at the first end of the body; an outer surface and an inner surface with a thickness therebetween; and the body is adapted to expand from about 1% to about 75% along a transverse segment in the transverse dimension to change from the first configuration to the expanded second configuration and to shrink from about 1% to about 75% along the transverse segment in the transverse dimension from the expanded second configuration to the contracted third configuration when the sleeve is in place over the foil.

In some embodiments, the first foil shape includes a wing-like curvilinear foil shape or a double wedge foil shape. In some embodiments, the body is seamless. In some embodiments, the body further includes an opening at a second end. In some embodiments, the body includes a concave portion (e.g., a non-shape memory material). In some embodiments, the first foil shape and the second foil shape are substantially the same and in some embodiments they are different. In some embodiments, the third configuration is further adapted and configured to provide a lift force when the sleeve covers the foil and the foil moves relative to an air or water current.

In some embodiments, the foil includes a leading edge and a trailing edge and the sleeve is adapted to surround and cover the foil at a portion of the leading edge, a portion of the trailing edge, and an area between the edges. In some embodiments, the thickness varies from a first portion of the body to a second portion of the body. In some embodiments, the foil includes a rounded leading edge at the front of the foil and a trailing edge at the rear of the foil and the thickness is greater at the first portion corresponding to the rounded leading edge.

In some embodiments, the body includes a heat-responsive shape-memory polymer and the body is configured to undergo a shape-memory change from the first configuration to the expanded second configuration in response to heat. In some embodiments, the body includes a heat-responsive shape-memory polymer and the body is configured to undergo a shape-memory change from the expanded second configuration to the contracted third configuration in response to heat.

In some embodiments the foil and an inner surface of the body are substantially the same size. In some embodiments, the body includes an inner surface and the inner surface is smaller than the foil.

In some embodiments, a transverse segment of the body is adapted to undergo a first expansion change to provide between 0.010" and 0.25" of clearance between the inner surface of the body and the foil when the body changes from the first configuration to the expanded second configuration. In some embodiments, a transverse segment of the sleeve is adapted to undergo a first contraction change to remove between 0.010" and 0.25" of clearance between an inner surface of the body when it is in the expanded second configuration and the foil when the sleeve is in place over the foil.

In some embodiments, the body is adapted to deliver a compressive force over the surface of the foil when the sleeve is in place over the foil and the body is in the third configuration. In some embodiments, the outer surface of the body is substantially free of folds and wrinkles.

In some embodiments the sleeve includes a plurality of layers. In some embodiments, the sleeve thickness is between 0.1 mil to 120 mil or between 0.3 mil to 30 mil.

In some embodiments, the sleeve includes a channel or hole. Some embodiments include a coating on the outer surface of the body. Some embodiments include an adhesive on the inner surface of the body. Some embodiments include a wear indicator (e.g., in or as part of an inner layer). Some embodiments include a wire, a P-static dissipative material, and/or at least one of a radar interference material and a radar reflective material. Some embodiments include a metal. In some embodiments, the body includes a thermoplastic polyurethane material (e.g., with a shore hardness value from 60 Shore A to 70 Shore D). In some embodiments, the body includes an aliphatic polyurethane with a durometer hardness around 60 Shore D. In some embodiments, the body includes Tecoflex® aliphatic polyurethane with a durometer hardness around 93 Shore A. In some embodiments, the body includes an aliphatic thermoplastic polyurethane of polycaprolactone and/or polycarbonate.

Another aspect of the invention provides erosion-resistant sleeve for protecting a foil, the foil including an airfoil or hydrofoil having a first foil shape, the sleeve including body covering at least a portion of the foil, the body including an outer surface and an inner surface and a sleeve thickness therebetween and having a longitudinal dimension and a dimension transverse to the longitudinal dimension, the outer surface including a materially continuous perimeter circumscribing the foil around the transverse dimension and having a second foil shape, the inner surface including the first foil shape, and the body has been contracted from a larger size to a smaller size to conform around the foil.

In some embodiments, the first foil shape includes a wing-like curvilinear foil shape or a double wedge foil shape. In some embodiments the body is seamless. In some embodiments, the body further includes an opening at a second end. In some embodiments, the body includes a concave portion (such as, for example, a non-shape memory material).

In some embodiments, first foil shape and the second foil shape are substantially the same and in some other embodiments, they are different. In some embodiments, the second foil shape is adapted and configured to provide a lift force when the sleeve covers the foil and the foil moves relative to an air or water current. In some embodiments, the foil includes a leading edge and a trailing edge and the sleeve is adapted to surround and cover the foil at a portion of the leading edge, a portion of the trailing edge, and an area between the edges.

In some embodiments, the thickness varies from a first portion of the body to a second portion of the body. In some embodiments, the foil includes a rounded leading edge at the front of the foil and a trailing edge at the rear of the foil and the thickness is greater at the first portion corresponding to the rounded leading edge.

In some embodiments, the body includes a heat-responsive shape-memory polymer and the body underwent a shape-memory change in response to heat.

In some embodiments, the foil and the inner surface of the body are substantially the same size.

In some embodiments, a transverse segment of the body underwent a first contraction change from about 1% to about 75% in the transverse dimension. In some embodiments, a transverse segment of the sleeve underwent a first contraction change to remove between 0.010" and 0.25" of clearance between the inner surface of the body and the foil.

In some embodiments, a transverse segment of the body is configured to deliver a compressive force over the surface of the foil.

In some embodiments, the outer surface of the body is substantially free of folds and wrinkles.

In some embodiments, the sleeve includes a thermoplastic polyurethane material. In some embodiments, the sleeve has a shore hardness value from 60 A to 70 D. In some embodiments, the sleeve includes an aliphatic polyurethane with a durometer hardness around 60 Shore D. Some embodiments include Tecoflex® (an aliphatic polyurethane with a durometer hardness around 93 Shore A). Some embodiments include an aliphatic thermoplastic polyurethane including at least one of polycaprolactone and polycarbonate.

Some embodiments include a plurality of layers. In some embodiments, the sleeve thickness is between 0.1 mil to 120 mil or between 0.3 mil to 30 mil.

Some embodiments include a channel or hole through the body. Some embodiments include a coating on the outer surface of the body. Some embodiments include an adhesive on the inner surface of the body. Some embodiments include a wire, a P-static dissipative material, a metal and/or at least one of a radar interference material and a radar reflective material.

Another aspect of the invention provides a method for installing an erosion-resistant sleeve on a foil including the steps of: inserting the foil into the sleeve through an opening in the sleeve; contracting the sleeve around the foil; and conforming the sleeve around the foil. In some embodiments, conforming includes substantially covering the entire foil with the sleeve.

In some embodiments the sleeve includes a body having a longitudinal dimension with a first end and a second end and a dimension transverse to the longitudinal dimension and the step of contracting includes heating the sleeve to contract an inner transverse segment of the body from about 1% to about 75% in the transverse dimension.

In some embodiments, the step of conforming includes providing an external sleeve surface that is substantially free of wrinkles and folds.

In some embodiments, the step of contracting includes contracting the entire sleeve around the foil. In some embodiments the foil includes a concave portion and a non-concave portion and the step of contracting includes contracting the sleeve over the non-concave portions the method further including maintaining the shape of the sleeve corresponding to the concave portions of the foil. In some embodiments, the step of contracting includes progressively contracting the sleeve from the first end of the sleeve to the second end of the sleeve. In some embodiments, the step of contracting includes applying a stimulus to the sleeve and thereby contracting the sleeve.

In some embodiments, the sleeve includes a shape-memory polymer and the step of applying a stimulus includes applying energy to the shape-memory polymer and thereby contracting it. In some embodiments, the step of applying energy to the shape-memory polymer and thereby contracting it includes applying one of convective heat, conductive heat and infrared energy.

In some embodiments, the sleeve is elastically dilated by an applied force and the step of contracting includes removing the applied force and thereby shrinking the sleeve.

In some embodiments, the step of conforming includes creating a compressive force between the foil and the sleeve. In some embodiments, the step of conforming includes creating an interference fit between the inner surface of the sleeve and the outer surface of the foil.

In some embodiments, the step of conforming includes conforming the sleeve around the foil without using an adhesive between the sleeve and the foil and in some other embodiments, the step of conforming includes adhering the inner surface of the sleeve to outer surface of the foil with an adhesive.

Some embodiments include the step of expanding the sleeve prior to the inserting step and thereby creating clearance between the sleeve and the foil.

In some embodiments, the foil includes a helicopter rotor blade or a helicopter tail blade, and the step of inserting the foil includes inserting the foil while the blade is attached to the helicopter.

Another aspect of the invention provides a method of protecting a foil with an erosion-resistant sleeve from erosion including the steps of: moving the foil enclosed within the sleeve relative to a media, the sleeve including an outer surface and an inner surface and a sleeve thickness therebetween and having a longitudinal dimension with a first end and a second end and a dimension transverse to the longitudinal dimension, the outer surface including a shape memory polymer or an elastomeric polymer with a materially continuous perimeter circumscribing the body around the transverse dimension and having a second foil shape; subjecting the foil with the sleeve to an erosion force from the media; and preventing a portion of the foil covered by the sleeve from eroding.

In some embodiments the step of preventing includes eroding a portion of the sleeve in response to the erosion force.

In some embodiments, the foil includes an airfoil, and the method further includes moving the airfoil through air during airfoil use that provides lift to an attached machine while protecting the airfoil from damage from the air.

Some embodiments include the step of protecting the airfoil from at least one of rain, sand, and snow. In some embodiments, the foil includes a hydrofoil, and the method further includes protecting the hydrofoil from damage from the water.

In some embodiments, the foil includes a hydrofoil and the method further includes the step of moving the hydrofoil through water during hydrofoil use that provides lift to a connected machine while protecting the hydrofoil from damage from the water.

Some embodiments include the step of inserting the foil into the sleeve through an opening in the sleeve; contracting the sleeve around the foil; and conforming the sleeve around the foil prior to the using a foil step.

BRIEF DESCRIPTION OF THE DRAWINGS

FIGS. 5A-C show how a protective sleeve can be expanded, placed over a rotor blade, and contracted around the blade.

FIGS. 6A-B show a protective sleeve with a variable thickness that fits on a rotor blade.

FIGS. 7A-7B show how a protective sleeve is placed over a rotor blade.

DETAILED DESCRIPTION

Described herein are systems, articles, materials, and methods for protecting an item from degradation and particularly for protecting a moving part such as an airfoil or hydrofoil from erosion. A system may include a sleeve that fits over the foil and minimizes or prevents contact between a force of erosion and the foil. A sleeve of a system may have a materially continuous perimeter that circumscribes or is configured to circumscribe the item in need of protection. The materially continuous perimeter may enable forces that hold the sleeve in place on the item even against strong counterforces that would otherwise remove the sleeve from the item. A sleeve of a system may include a shapeable covering with an expanded configuration and a contracted configuration that is placed over the item in the expanded configuration and contracted to the contracted configuration to conform to the surface of the item. A sleeve may conform to the outside surface of the foil when it is on the foil. A sleeve may provide forces that hold the sleeve in place on the foil, even when the foil is subject to harsh conditions such as a sandstorm or fast moving wind or when part of the sleeve is damaged or missing. Such a sleeve may provide various advantages especially compared with existing protection systems, such as providing better foil protection, having an ability to remain on the foil even under adverse conditions, being easier or faster to remove or install, preventing a corona effect, and so on.

Figure 1A:
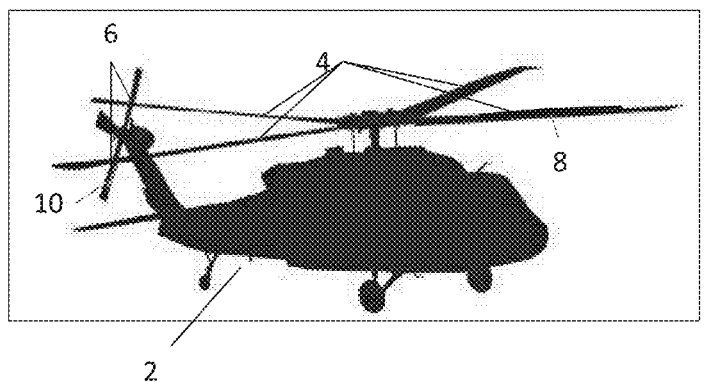
FIG. 1A shows a helicopter with protective sleeves over the main rotor blades and tail rotor blades.
Figure 1B:
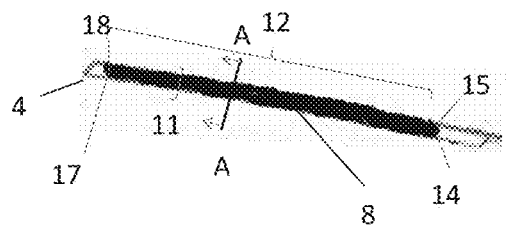
FIGS. 1B-1C show variations of protective sleeves over helicopter rotor blades.
Figure 1C:
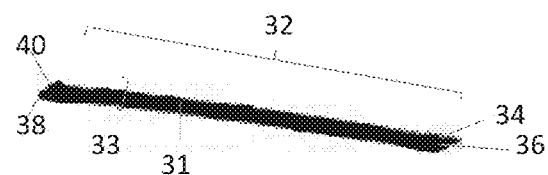
Figure 2:
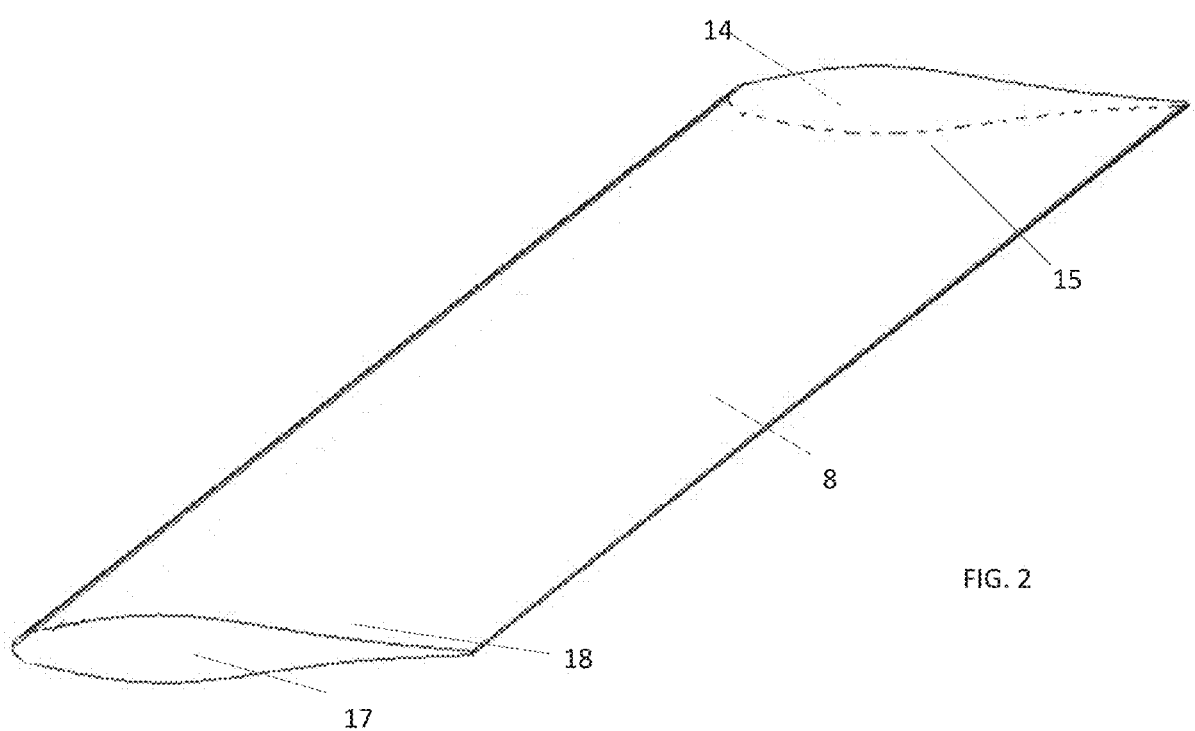
FIG. 2 shows a perspective view of the protective sleeve shown in FIG. 1B.

FIG. 1A shows helicopter 2 with rotor blade 4 of a main rotor and tail rotor blade 6 of a tail rotor. The rotor blade has a (first) foil shape and, when in use, provides an aerodynamic lift force to move the helicopter. FIGS. 1B-1C shows rotor blades such as those shown in FIG. 1A partially covered and circumscribed by protective sleeves as described herein. FIG. 2 shows a perspective view of the sleeve shown in FIG. 1B without the rotor blade.

FIG. 1A also shows rotor blade 4 circumscribed and mostly covered by sleeve 8 and tail rotor blade 6 circumscribed and mostly covered by tail rotor sleeve 10. Sleeve 8 or tail rotor sleeve 10 may protect the rotor blade or tail rotor blade, respectively, from damaging forces while the helicopter is in flight as well as when it is on the ground. Damaging forces may include general environmental and weather forces often considered erosion forces, such as hail, lightning, rain, rocks, sand, snow, sunlight, and wind that can act on the blade and cause blade damage and erosion. Damaging forces may include other natural or non-natural forces, such as a moving object such as an animal, a bird, a bullet, a fragment, other debris, pebbles, shards, shot, shrapnel, or shock or other waves, etc. Helicopter movement may cause or may increase the frequency and intensity of damaging forces. For example, when a helicopter rotor blade spins very fast (e.g., on the order of up to 500 revolutions per minute), and is engaged to generate a lift force (e.g., the helicopter travels through the air at speeds up to 250 miles per hour (mph)), a helicopter blade encounters objects with higher frequency and intensity than it does when it is on the ground. These forces may be especially noticeable during take-off and landing when pebbles and ground debris are forced against the blades and can cause severe localized damage. Forces that damage a rotor blade change the blade shape and integrity, preventing it from working properly, and disrupting flight. Sleeve 8 provides a covering or barrier that at least partially covers the rotor blade and protects it from damaging forces. As shown in FIG. 1B and FIG. 2, sleeve 8 has two dimensions: a first (longitudinal) dimension 12 and a second (transverse) dimension 11 transverse to the longitudinal dimension. A sleeve length in the first dimension extends from first opening 14 at first end 15 of the sleeve to second opening 17 at second end 18 of the sleeve. The open first end may be useful for allowing the blade to be attached to the rest of the rotor (e.g., attaching or connecting the blade to the rotor shaft), for allowing access to the helicopter main rotor to which the blade is connected etc., but in general is useful for placing the sleeve over the rotor blade. The open second end may be useful for positioning the sleeve over the blade, for preventing sleeve wrinkling, or for exposing a portion of a blade. For example a lip of a blade may be covered by a different material or different covering. A sleeve may have a foil shape on its outer surface (e.g., a second foil shape; the first foil shape referring to the shape of a foil that the sleeve may cover) or inner surface (e.g., a third foil shape) or on both surfaces. The first, second, and third foil shapes may be any, such as, for example, one of the foil shapes described below and may be the same or may be different from each other. In some examples, a sleeve may have a wing-like curvilinear shape, and may have one or more of an angle, a bend, a curve, a twist, a windswept end or tip, etc. As indicated above, sleeve 8 (and the rotor blade) has a second (transverse) dimension 11 transverse to the first (longitudinal) dimension (e.g., in a dimension shown by a line segment falling on the plane indicated by A-A or a plane substantially parallel to A-A). Sleeve 8 has a materially continuous perimeter circumscribing blade 4 in the transverse dimension. Sleeve 8 goes around (e.g., all the way around) the outside of blade 4 as a continuous material (e.g., without an end and without a seam). A transverse cross-section of a sleeve exhibits a defined inner area. In general, a sleeve as described herein will have a first (longitudinal) dimension, and a second dimension transverse the first dimension with a materially continuous perimeter that circumscribes or is adapted to circumscribe an item. The description of foil and sleeve dimensions as "longitudinal" and "transverse" are to some extent for convenience and simplicity: while a longitudinal length of a sleeve (or foil) will generally be longer than a transverse distance or length of a sleeve (or foil), a longitudinal length may in other cases be shorter than (or the same as) a transverse distance or length. In general, a transverse dimension of a sleeve is the dimension that is materially continuous and a transverse dimension of an object is the dimension circumscribed (circumscribable) by the transverse dimension of the sleeve. In other words, a sleeve may be relatively long (like a shirt sleeve) or relatively short and narrow (like a rubber band). Similarly, a length of the sleeve in a longitudinal dimension may be longer than, the same length, or shorter than a perimeter length (e.g., that goes all the way around) in the transverse dimension.

FIG. 1C shows another variation of a sleeve on a rotor blade. A rotor blade (not visible in this view) is covered and circumscribed by sleeve 31, but in this variation the sleeve has a closed second end 40 that forms windswept tip 38 at the end of the rotor blade. Similar to sleeve 8 described above, sleeve 31 has two dimensions: a first (longitudinal) dimension 32 and a second (transverse) dimension 33 transverse to the longitudinal dimension. Sleeve 31 has first opening 36 at first end 34 that may be useful for sleeve placement on a rotor blade or for other purposes, such as those described above. The closed second end may be useful for protecting the end of the blade from damaging forces, for materially helping to hold the sleeve in place, for ensuring that the sleeve does not have an edge that might otherwise be vulnerable to forces that would tend to lift or remove the sleeve away from the foil, or for any other purpose.

Figure 3A:
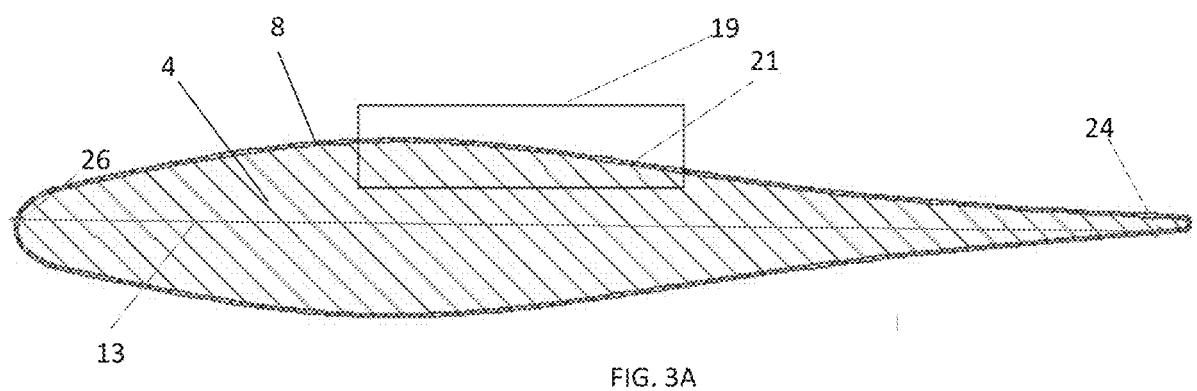
FIG. 3A shows a cross-sectional view of a protective sleeve over a rotor blade.
Figure 3B:
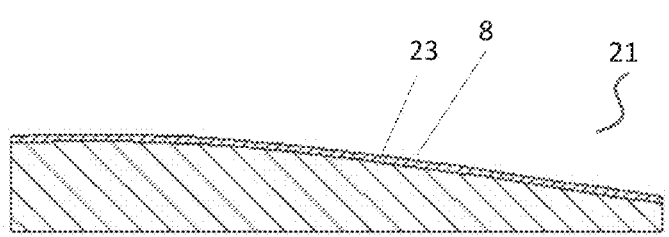
FIG. 3B shows a detail view of part of the protective sleeve and blade shown in FIG. 3A.
Figure 4A:
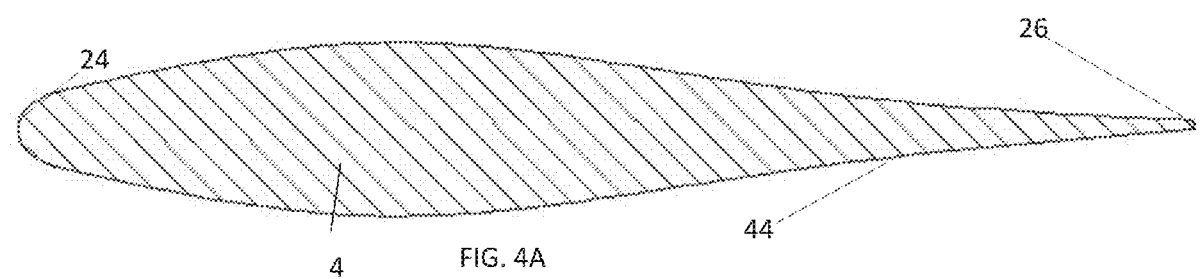
FIGS. 4A-4B show, respectively, a rotor blade and a protective sleeve that conforms to a rotor blade.
Figure 4B:
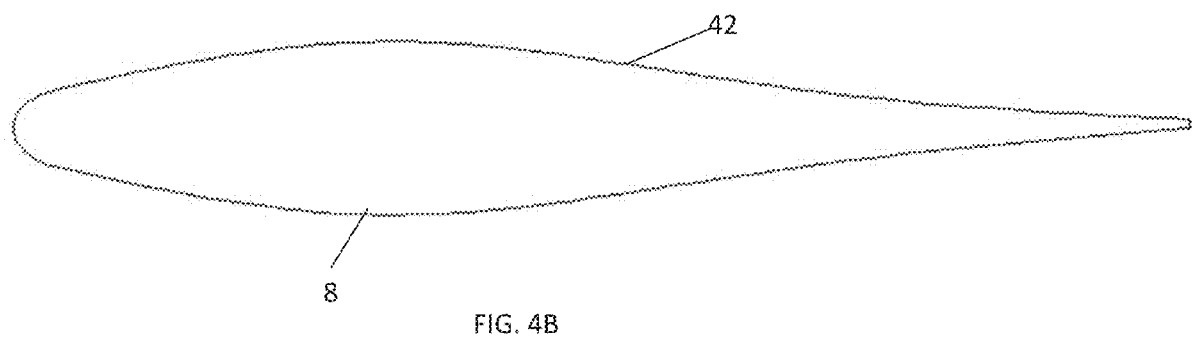

FIG. 3A shows a cross-sectional view of rotor blade 4 and sleeve 8 through the plane shown by A-A in FIG. 1B, and FIG. 3B shows a detail view of the section 21 of the sleeve and foil shown in box 19 in FIG. 3A. Sleeve 8 has a materially continuous perimeter circumscribing the sleeve body around the second (transverse) dimension 13. The materially continuous perimeter of sleeve 8 also circumscribes blade 4 around a transverse dimension of the blade (e.g., a materially continuous outer surface that circumscribes a transverse dimension or line segment of the blade falling on the plane indicated by A-A or a plane substantially parallel to A-A in FIG. 1B). FIG. 3B shows sleeve 8 apposed to and conforming to outer surface 23 of blade 4. FIGS. 3A and 4A also shows rotor blade 4 with leading edge 26 and trailing edge 24. As shown in FIGS. 3A and 4B, sleeve 8 is adapted to surround and cover blade 8 at a portion of the leading edge, a portion of the trailing edge and an area between the edges.

FIGS. 4A-4B shows a cross sectional views of rotor blade 4 and sleeve 8, respectively through the line shown by A-A in FIG. 1B. The sleeve and rotor blade are separated from each other for illustration purposes. The size and shape of inside surface 42 of rotor blade sleeve 8 is the same size and shape as outer surface 44 of rotor blade 4. In general, the sleeve (e.g., the inner surface of a sleeve) conforms to the surface of the blade it circumscribes. The (first) foil shape of the rotor blade is the same as the (third) inner foil shape of the sleeve. In this view, the (second) outer foil shape of the sleeve is also the same as the first and second foil shapes, but in other variations may be different shapes. A blade may include one or more features, such as markings, sensors, wear bars, etc. that may be considered to be part of the blade.

FIGS. 5A-C show successive cross-sectional views of putting a protective sleeve on a rotor as the sleeve is expanded, a rotor blade is inserted, and the sleeve is contracted to conform to the rotor blade. Sleeve 50 has been manufactured in a first, relatively smaller size and is configured to be expanded to fit over the foil and then to contract to conform around the foil. In particular, sleeve 50 is configured to change size and/or shape to go from a first size with a first sleeve shape to a second size with a second sleeve shape and then to a third size with a third sleeve shape. A sleeve may change size and shape to go from a relatively smaller first size (first sleeve shape) to a relatively larger second size (second sleeve shape) for inserting the foil into the sleeve, and then to a third size with a third sleeve shape that fits onto (conforms to) the surface of the foil. A sleeve having the relatively smaller first size may have an inner surface and/or an outer surface that are smaller than the second size and/or smaller than the foil. As shown in FIG. 5A, sleeve 50 has outer surface 52, inner surface 54 and sleeve thickness 56 between the inner and outer surfaces. Sleeve 50 is provided or manufactured at a relatively small first size. As shown in FIG. 5A, sleeve 50 in a first configuration is expanded to form sleeve 50' having a (second) expanded configuration sufficient to allow a foil to be inserted into sleeve 50 (e.g., with sufficient clearance between the blade and the inner surface of the sleeve). (Items or features in the drawings that are changed in configuration are shown by the addition of prime marks (', ", etc.)). As explained below, all or only part of sleeve 50 may be expanded. In other words, part of sleeve 50 may be expanded to form sleeve 50' and part may be left unexpanded (e.g., in a first size or first shape or configuration that is not expanded) as long as expansion of the sleeve as a whole allows sufficient clearance between the sleeve and the foil so that the foil can be inserted into the sleeve. In FIG. 5C, a foil (not shown in this view) to be protected (or enclosed) was inserted into expanded sleeve 50' and expanded sleeve 50' in the second configuration is contracted around the foil to form contracted sleeve 50" in the third configuration. As explained below, all or only part of sleeve 50' may contract around the foil. Part of a sleeve may not contract (e.g., may remain in an uncontracted or first shape or configuration). All or only part of the sleeve may change shape and the entire sleeve may still fit or conform around the foil.

A sleeve may be configured to provide a force to a foil to hold the sleeve and foil together. A sleeve may contract less than a maximum amount it is configured to contract (or which is capable of contracting) in order to provide a force, such as a compression force, against a foil when the sleeve contacts the foil. As illustrated in FIGS. 5A-5C, sleeve 50" is larger than sleeve 50. Sleeve 50" may apply a compressive force onto a blade when in place on the blade. Sleeve 50" may be held in a slightly expanded configuration by a foil. The foil prevents the sleeve from fully contracting back to its first size. When the sleeve is on the foil, the inner surface of the sleeve body and the foil may be generally the same size and same shape. For example, the inner surface of the contracted sleeve may generally conform to the size and shape of the foil, but there may be an irregularity or feature between them such as an irregular surface (dent or hole) on the foil, a thin adhesive layer, a small feature such as a sensor or wear bar between the surface of the sleeve and the foil, etc. In other examples, the sleeve may fit around and conform to the foil without any irregularity or feature between them. An outer (and inner) surface of a sleeve may be substantially free of surface irregularities (e.g., folds or wrinkles) during sleeve formation or when a sleeve is in place on a foil. In such cases, there may be an occasional irregularity (e.g., fold or wrinkle) as long as it does not substantially negatively impact foil aerodynamics. Generally, an outer surface of a sleeve on a foil will be substantially smooth and aerodynamic.

In some variations, and as mentioned above, a sleeve as described herein may expand or stretch (or be configured to expand or stretch) to fit over a foil. As shown in FIGS. 5A-5B, sleeve 52' has been expanded from its contracted configuration shown by sleeve 50 to fit around a foil. The sleeve may be expanded in a cross-sectional dimension by elongating part or all of a perimeter (wall) of the sleeve in a dimension transverse to a longitudinal dimension. As shown in FIG. 5A, a sleeve may be expanded by elongating in a transverse dimension transverse segment 62 shown in box 64 of the sleeve perimeter. A transverse segment of a sleeve may expand in a dimension that generally follows chord 58 and/or width 60 of a sleeve and part or all of a sleeve perimeter may be expanded. A sleeve thickness may be increased or remain unchanged, but in general a sleeve thickness may be slightly decreased as a sleeve is expanded. A transverse segment of the body may be expanded (or be adapted to undergo an expansion change) or lengthened to more than 0% to 300%, from 1% to 250%, from 1% to 100%, to about 1% to about 75%, from 5% to 75%, from 10% to 50% in the transverse dimension (as the sleeve changes from the first configuration to the second configuration). A transverse segment of the body may be expanded (or be adapted to undergo an expansion change) to provide between 0.01" and 2" of clearance, between 0.010" and 1" of clearance, between 0.010" and 0.5" of clearance, between 0.010" and 0.25" of clearance, etc. between part or all of an inner surface of the sleeve body and the foil.

An expanded sleeve, such as sleeve 50' shown in FIG. 5B, may have any inner surface having an internal shape or any outer surface having an external shape that allows a foil to be inserted into it, but generally both the inner and outer surfaces of a sleeve will have foil shapes. In some examples, the inner and outer surfaces may have same foil shape. For example, it may be easier to manufacture a sleeve that has the same inner and outer foil shapes or the desired (final) shape of the sleeve may be easier to control if the inner and outer foil shapes of the sleeve are the same during sleeve placement on the foil. In some examples, the inner and outer surfaces may instead have different shapes. For example, a portion of the sleeve may be thicker in some places than in other places creating different inner and outer surface shapes. For example, a foil may be configured to change the shape that would otherwise be presented by a uncovered blade alone, such as providing more or less concavity in the (final) foil shape, providing sharper or blunter leading or trailing edges, and so on. A thickness of the sleeve body may vary from a first portion of the sleeve body to a second portion of the sleeve body. FIG. 6A shows foil 104 with leading edge 126 at the front of the foil and trailing edge 124 at the rear of the foil. FIG. 6B shows sleeve 108 adapted to fit around foil 104. Inner surface 142 of sleeve 108 fits around outer surface 144 of foil 104. Sleeve leading edge 130 is adapted to fit over foil leading edge 126 and sleeve trailing edge 128 is adapted to fit over foil trailing edge 124. The thickness of the sleeve may be thicker at first portion 131 of the body to a second portion 133 of the body. FIGS. 6A-6B also show rounded sleeve leading edge 130 at the front of the foil has a greater thickness than does sleeve trailing edge 128 at the rear of the foil (or than at other portions of sleeve 108).

In some variations, and as mentioned above, a sleeve as described herein may contract (or be configured to contract) to conform to a foil. As shown in FIGS. 5A-5B, sleeve 52' has been expanded from the configuration of sleeve 50 to fit around a foil. The sleeve may be contracted to conform to the foil. The sleeve may be contracted in a cross-sectional dimension by contracting part or all of a perimeter (wall) of the sleeve in a dimension transverse to a longitudinal dimension. As shown in FIG. 5B, a sleeve may be contracted by contracting or shortening in a transverse dimension a transverse segment of the sleeve perimeter. As shown in FIGS. 5B-5C, a transverse segment of a sleeve may contract in a dimension that generally follows chord 58' and/or width 60' of a sleeve and may encompass part or all of a sleeve perimeter. A transverse segment of the body of may be contracted or shortened (or be adapted to undergo a contraction change or shortening) to conform the transverse segment (and remainder of the sleeve) around a foil (not shown in this view), as shown in FIG. 5C by contracted segment 62" in box 64". The segment shows relative to both chord 58' and width 60'. A transverse segment of the body of may be contracted or shortened (or be adapted to undergo a contraction change or shortening) from about 1% to about 75%, 0.1% to 100%, 1% to 50%, 5% to 50%, and so on in a transverse dimension. A transverse segment of the body may be contracted (or be adapted to undergo a contraction change) to remove between 0.01" and 2" of clearance, between 0.010" and 1" of clearance, between 0.010" and 0.5" of clearance, 0.010" and 0.25" of clearance between the inner surface of the body and the foil when the sleeve is in place over the foil. An entire sleeve may be contracted at one time or may be contracted in stages or in a continuum over time. For example, an entire sleeve may be contracted essentially at one time by removing a force or providing a stimulus that affects or acts on the entire sleeve. In other examples, a sleeve may be contracted (sequentially or continuously) from a first end to a second end, such as from a closed end to an open end. In other examples, a sleeve may first be contracted in a central portion of a sleeve and contraction continued towards both the first end and the second end. For example, starting the contraction in the middle may make it easier to prevent or remove wrinkles while starting the contraction on an end may make it easier to fit a sleeve over a swept tip end. A transverse segment such as shown in any of FIGS. 5A-5C may be configured to expand, to contract, or both at different times. A transverse segment of a sleeve such as described herein may undergo (or be adapted to undergo) a first expansion change in response to an expansion force to provide clearance between an inner surface of the sleeve and an outer surface of foil, and to contract when the force is removed or when a stimulus is applied and thereby deliver a compressive force over the surface of the foil when the sleeve is in place over the foil. A sleeve material may undergo or be configured to undergo contraction or expansion, or both. (Some portions of a sleeve material may not or may not be configured to undergo contraction or expansion). In some examples, a material such as an elastomeric material may be configured to expand and contract more than once (a plurality of times). Such expandability and contractibility may aid, for example, in wrinkleless sleeve placement over foil. In some examples, a sleeve may expand (or be configured to expand) in a longitudinal dimension (such as along longitudinal dimension 12 or longitudinal dimension 32 shown in FIGS. 1A-1B). Longitudinal expansion may be useful, for example to better fit a sleeve over a foil or to help place a sleeve over an irregular portion of a foil (such as over a foil tip that is twisted). Longitudinal expansion may be between 0% and 20%, from 1% to 15%, from 1% to 10%, etc. In some examples, a sleeve may be configured to not expand and/or contract in a longitudinal dimension. Preventing such change may make it easier to place a sleeve on a foil in a desired location without forming wrinkles or creating an area of sleeve overlap.

A sleeve on a foil, such as sleeve 50" shown in FIG. 5C, may be held on a foil in any way that prevents the sleeve from coming off the foil, but in general may be (mechanically) secured to the foil by an interference fit (e.g., a friction fit) between a sleeve and the foil. An interference fit may be between an inner surface of a sleeve and an outer surface of a foil. In some examples, as a sleeve encircles (a cross-section of) a foil shaped article, and can remain affixed to the foil shaped article without any adhesive (e.g., without a pressure-sensitive adhesive, epoxy, 2-part or multi-part epoxy) between the sleeve and the foil. A sleeve may be shaped onto a foil so that the inner surface of the sleeve slightly intercalates into surface irregularities on the outer surface of the foil. Such irregularities may be microscopic or larger than microscopic in scope. A sleeve may not be able to be "peeled off". A sleeve may be secured or held onto the foil by a continuous (endless) material which material is held together by chemical bonds (e.g., covalent bonds, ionic bonds, etc.). A sleeve material may include a single material or may include two (or more) materials graded into one another so as to create a continuous material without an end. A material may, for example, have no sudden or discontinuous changes in one or more chemical, material, or physical properties, such as chemical stability, coefficient of friction, compressive strength, flexural modulus, glass transition temperature, hardness, plasticity, resilience, refractive index, roughness, shear modulus, shear strength, specific modulus, specific strength, specific weight, etc. around a transverse dimension or throughout a sleeve. Affixing without a pressure-sensitive adhesive may make installation easier with fewer concerns over substrate preparation, and may allow installation in challenging environments without the need for as much special equipment, special cleaners, or a special environment. It may also prevent problems due to the presence of residual adhesive residue (from removing an old sleeve) that might otherwise interfere with placement or performance of a new or replacement sleeve on a foil. In some examples, an adhesive (e.g., a pressure-sensitive adhesive, epoxy, 2-part or multi-part epoxy, etc.) may hold or help hold some or all of a sleeve onto a foil. An adhesive may be placed between some or between essentially all of a sleeve and a foil. A pressure sensitive adhesive may adhere to a surface with slight pressure. It may or may not require activation by heat, solvent, water, etc. A pressure sensitive adhesive may create an immediate bond upon application and be more or less permanent. In other cases, a pressure sensitive adhesive may be removable or allow for repositioning of a material on a substrate being adhered without leaving adhesive on the substrate or delaminating part of the substrate. It may form a bond that remains tacky for a long time. A sleeve may be prevented from moving (e.g., longitudinally and/or transversely) due to static friction between the inner surface of the sleeve and the outer surface of a foil shaped article (e.g., a normal force or force transverse to the surface). Engagement of these surfaces may be caused by the interference fit. A sleeve may not prematurely detach without failure of the sleeve itself. A sleeve and foil shaped article may be held together at least in part by any covalent bonding, interactive force or interfacial force, such as dipole-dipole interaction, hydrogen bonding, ionic bonding, van der Waal forces, etc. A smooth inner surface of a sleeve may be held onto a smooth foil surface such as by static friction; a rough inner surface may be held onto a soft (or rough) foil surface by mechanical interaction. In some examples, even if a portion of a sleeve is broken off, damaged, torn, or otherwise loosened from a foil shaped article, the sleeve may be held onto the foil. For example, the mechanical interlocking force of the sleeve encircling the foil shaped article may hold the sleeve on the foil.

An interference fit may be achieved, for example, using a sleeve made of a shapeable material such as shape-memory material and/or an elastomeric material. A shape-memory sleeve may be formed to size to have a cross-sectional dimension equivalent to or slightly smaller than a cross-sectional dimension of the foil-shaped article to be covered by the sleeve. The sleeve may be dilated and temporarily fixed (stabilized) in a dilated/expanded/stretched state to facilitate sleeve application to a foil. Such a sleeve may be applied to the foil shaped article by sliding the sleeve over the object. Heat or another stimulus may be applied to the sleeve to return the sleeve to (or close to) its original size. An elastomeric sleeve may be formed to have a cross-sectional dimension equivalent to or slightly smaller than a cross-sectional dimension of a foil shaped article to be covered. An elastomeric sleeve may have elastic behavior, and may be configured to be deformed by an applied (expansion) force and to exhibit recovery if the force is removed. An elastomeric sleeve may be elastically "dilated" by application of a force along the sleeve body (or walls). An elastomeric sleeve may be applied via a mechanical means or via creation of a pressure differential between the interior and exterior of a sleeve. An elastomeric force applied to a sleeve may generally be below the elastomeric material's elastic limit; e.g., below the highest stress that can be applied without producing a measurable amount of plastic (non-recoverable) deformation. After successfully positioning the sleeve on a foil, the applied force may be removed and the elastomeric sleeve allowed to conform to the foil surface. An elastomeric sleeve on a foil may still be elastically dilated, though to a lesser degree than when the applied force was being applied.

A contracted sleeve, such as sleeve 50" shown in FIG. 5C, may have any inner surface having an internal shape or any outer surface having an external shape that may protect the foil, but generally both the inner and outer surfaces of a sleeve will have foil shapes. In some variations, the inner and outer surfaces may have same foil shape. For example, it may be it may be easier to manufacture a sleeve that has the same inner and outer foil shapes or the desired (final) shape of the sleeve may be easier to control if the inner and outer foil shapes are the same. In some examples, the inner and outer surfaces may instead have different shapes. For example, the inner surface may conform to the foil surface and the outer surface may provide a new overall foil shape when it is on the foil (e.g., it may change the foil shape otherwise presented by the blade alone, such as providing more or less concavity in the foil, sharper or blunter leading or trailing edges, features in an area of the foil, additional material on a portion of the sleeve that may be subject to greater forces, etc.). In some examples, an outer surface of a sleeve may have a lower coefficient of friction (COF) than an inner surface of a sleeve. Such a sleeve may facilitate holding the sleeve to the foil while providing excellent aerodynamic capability.

A method of installing an erosion-resistant sleeve on a foil may include inserting the foil into the sleeve through an opening in the sleeve; contracting the sleeve around the foil; and conforming the sleeve around the foil. A shape-memory polymer sleeve may be contracted, for example, by applying a stimulus (convective heat, conductive heat, energy, heat, infrared energy etc.) to the shape-memory polymer and thereby contracting. An elastically dilated sleeve (an elastomeric sleeve) dilated by an applied force may be contracted, for example, by removing the applied force and thereby shrinking or contracting the sleeve.

In some variations, a sleeve, such as the one shown in FIGS. 5A-5C, may have the same shape during different steps of being placed on a foil (blade). The inner (and/or outer surfaces) may have the same shape in the first, second (expanded), and/or third (contracted) configurations. For example, a sleeve may be manufactured, uniformly expanded for placing over a foil, and uniformly contracted onto the foil, maintaining the shape of the sleeve throughout the different steps. In some variations, a sleeve, such as the one shown in FIGS. 5A-5C, may have different shapes at different steps. For example, as described elsewhere herein in more detail, a sleeve may be non-uniformly expanded so that only a portion of the sleeve is expanded, thus changing the internal and external shapes of the expanded sleeve relative to the first (e.g., manufactured or initial shape). An expanded sleeve may be non-uniformly contracted so that only a portion of the sleeve is contracted or so that one portion is contracted to a greater extent than another area, thus changing the internal and external shapes of the contracted sleeve relative to the expanded sleeve. Such non-uniform contraction may be useful, for example, for providing better contact with a concave area of a foil or for covering a feature on a foil or blade. The third configuration of sleeve 50" may have or may be adapted and configured to provide a lift force or drag force when the sleeve covers the foil and the foil moves relative to a media current (e.g., relative to an air current, a water current, etc.).

A sleeve may also be elongated in longitudinal dimension (e.g. elongating between some or all of a first end of the sleeve to a second end of a sleeve such as from sleeve first end 17 to sleeve second end 14 in FIG. 1B). In some examples, a sleeve may not be elongated (or configured to elongate) in a longitudinal dimension. A sleeve may be elongated in at least one dimension by applying a force to the sleeve. It may be more difficult to fit a sleeve elongated in a longitudinal dimension to a foil. In some cases, it may be more difficult to control contraction in the longitudinal dimension to fit the sleeve around the foil. In some cases, longitudinal elongation and contraction may provide a better fit and additional force to hold the sleeve and foil together.

In some variations a sleeve as described herein may contract (or be configured to contract) to conform to a foil. FIG. 7A shows sleeve 70 which is larger than and configured to fit over and protect a foil. Sleeve 70 may, for example be manufactured in this relatively larger size. The sleeve may be contracted to sleeve 70' to conform to the foil, as described above for other variations. The sleeve may be contracted in a cross-sectional dimension by contracting part or all of a perimeter (wall) of the sleeve in a dimension transverse to a longitudinal dimension. As described above for other variations, a sleeve may be contracted by contracting or shortening in a transverse dimension a transverse segment of the sleeve perimeter. As shown in FIGS. 7A-7B a transverse segment of a sleeve may contract in a dimension that generally follows the directions indicated by chord 158' and/or width 160' of a sleeve and may encompass part or all of a sleeve perimeter that circumscribes a sleeve in a transverse dimension. A transverse segment of the body of may be contracted or shortened (or be adapted to undergo a contraction change or shortening) to conform the transverse segment (and remainder of the sleeve) as shown in FIG. 7B around a foil (not shown in this view) similar to the contraction shown in FIGS. 5B-C.

In some variations, an adhesive may be used for holding a sleeve onto a foil. An adhesive may be placed between a foil and a sleeve. An adhesive may be placed on an inner surface of a sleeve or an outer surface of a foil. An adhesive may be placed in between substantially any area between which the sleeve and the foil are apposed. An adhesive may be placed in between a subsection of the areas between which the sleeve and foil are apposed. For example, adhesive may be placed near an end of a sleeve, such as near first end 14 or second end 17 of sleeve 8 in FIG. 1B but not along the entire longitudinal dimension 12. A sleeve and a foil held together by an adhesive may be held using any method (covalent or non-covalent bonds, etc.).

A sleeve as described herein may be removable and replaceable without removing a foil (e.g., a helicopter rotor blade, etc.) that it covers from an object such as a helicopter. Such sleeves may reduce costs, prevent rotor damage, increase operational readiness etc.

A helicopter blade or other foil provides a lift or drag force to move a helicopter or another machine through air, water or another media. A blade with a sleeve generally provides a lift or drag force to move an object through a media. A sleeve that covers a blade (e.g., a sleeve that is a contracted and conformed around a blade as described herein) may be adapted and configured to provide a lift or drag force when the sleeve covers the blade or other foil, and the blade or other foil moves relative to air, water, or other media (e.g., relative to an air or water current). In some variations, a sleeve may cover an item that does not have a foil shape and the sleeve may provide a foil shape. Such a sleeve may be adapted and configured to provide a lift or drag force when the sleeve covers the item and the item with the sleeve in place moves relative to air, the environment, water or another media.

Described herein is a method of protecting a foil with an erosion-resistant sleeve from erosion that may include the steps of moving a foil enclosed within the sleeve relative to a media (e.g., air, a gas, a fluid, a gel, etc.), the sleeve including an outer surface and an inner surface and a sleeve thickness therebetween and having a longitudinal dimension with a first end and a second end and a dimension transverse to the longitudinal dimension, the outer surface including a shape memory polymer or an elastomeric polymer with a materially continuous perimeter circumscribing the body around the transverse dimension and having a second foil shape; subjecting the foil with the sleeve to an erosion force from the media; and preventing a portion of the foil covered by the sleeve from eroding (e.g., from rain, sand, snow, sun, wind, etc.). In some examples, the sleeve may erode in response to the erosion force. In some examples, the sleeve may generally not erode (and may be erosion-resistant or erosion-proof). In some examples, the method includes creating friction between the foil and the sleeve during foil use and thereby holding the sleeve against the foil. In some examples the foil is an airfoil, and the method further includes moving the airfoil through air during airfoil use that provides lift to an attached machine (e.g., an airplane, a helicopter, etc.) while protecting the airfoil from damage from the air or other damaging forces. In some examples, the foil is a hydrofoil, and the method includes protecting the hydrofoil from damage from water and in other examples, the method includes moving the hydrofoil through water during hydrofoil use that provides lift to a connected machine (e.g., a boat, another watercraft, etc.) while protecting the hydrofoil from damage from the water or other damaging forces. The method may further include the steps of inserting the foil into the sleeve through an opening in the sleeve; contracting the sleeve around the foil; and conforming the sleeve around the foil prior to the using a foil step.

A sleeve for a foil as described herein generally has a materially continuous perimeter in a transverse dimension. Such a perimeter generally has no seam and no end (e.g., is endless or seamless without interruption) in the transverse dimension. A sleeve may have no seam in any dimension. A sleeve may have one edge (e.g., at a first end) or more than one edge (e.g., an edge at a first end and an edge at a second end) and the edges may not meet when a sleeve is on a foil. An edge may be smooth and may not have any sharp turns. An edge may be thinner or thicker than or tapered relative to adjacent portion of the foil A foil covered by a covering may have a leading edge and a trailing edge, and the sleeve (a materially continuous perimeter) may be adapted to surround and cover the foil at a portion of the leading edge, a portion of the trailing edge, and an area between the edges.

In some variations, an intervening layer, an inner surface, or an entire covering may be seamless. Any of these layers may include only one material or may include more than one material joined together without a seam.

As described herein, a sleeve may be erosion protective and may include an erosion-protective material. A sleeve may be adapted and configured to protect a foil from erosion when the sleeve is in place on a foil. A sleeve may include a material that is preferentially eroded or preferentially erodes. A sleeve may include an erosion-resistant material configured to resist erosion and to not erode away or erode away more slowly than a foil subject to the same forces of erosion. A sleeve (e.g., an eroded sleeve) may be removed and may be replaced with a new sleeve. A sleeve may include an erosion-protective material configured to preferentially erode and thereby protect a foil which it covers.

A sleeve as described herein may be a shapeable covering. As mentioned above, a sleeve may be made from a material that has changed its size and/or shape or is configured to change its size and/or shape to fit onto or conform to the size and shape of a foil. A sleeve may be made from a material that fits onto (conforms to) a foil and provides protection may be used. While in some examples, all sleeve material may conform to or be configured to conform to the shape of the foil, in other examples only a portion of the sleeve material may conform or be configured to conform to the foil. For example, as described elsewhere herein, portions of the material may not change shape such that they fit onto a concave portion of a blade. Such a portion may be a shape-memory material that is not contracted, or may be a non-shape memory material (e.g., elastomeric or a plastic polymer) in a substantially shape-memory sleeve. For example, part of a sleeve may be made of another material that provides other features or functionalities (such as radar absorbing materials, thermally conductive materials, etc.).

A sleeve may be made using any process or combination of processes to create the sleeve, create layers, create or add features, etc., such as co-extrusion, dip-coating, extrusion, heat-sealing, multi-layer extrusion, overlaying, over-the-wire extrusion, spraying, transition extrusion welding, etc. Extrusion or any other process may be used to add a feature such as adding a channel, a stripe, a through-hole (axial void or "lumen"), a wire, etc. or a layer to a sleeve, which may be added at the same time as the sleeve is formed or may be added afterwards. Additional features or layers may be added by dipping, laminating, spraying, etc. Two or more layers may be joined together, such as by using a primer or adhesive (tie-layering). The thickness of a sleeve may be varied, for example by using transition extrusion so that one portion of a sleeve is thicker than another portion. Equipment for performing such processes is known in the art, such as extrusion equipment and manufacturing processes from Davis Standard, etc.

In some variations, a sleeve may include a shape-memory polymer or shape-memory alloy. A sleeve may also include other materials. A shape-memory polymer of a sleeve will generally be a stimulus-responsive shape-memory polymer configured to change shape in response to an applied external stimulus. An applied external stimulus may be, for example, energy, such as conductive heat, convective heat, electricity, energy, heat, infrared energy, light, magnetism, moisture (e.g., a solution), etc. A shape-memory polymer may be a 'heat-shrink' polymer. A shape-memory polymer may have the ability to change from a first (also referred to as original, rigid, glassy, or "permanent") state to a second (also called temporary or rubbery) state and then back to (or close to) the first (original or "permanent") state. A material's glass transition temperature $T_g$ is the temperature at which this reversible transition between the glassy state and the rubbery state occurs. (The glass transition temperature is generally seen as a large drop (in the storage modulus, when viewed on a log scale against a linear temperature scale). However, a sleeve made from a shape-memory polymer as described herein may be prevented from fully returning to its original shape. Instead, a sleeve may only attempt to return to its original shape and may therefore provide a force against a foil to hold the foil on the sleeve.

As indicated above, in some examples a sleeve made from a shape-memory polymer, placed on a foil in a second (temporary, stable) shape and subject to an applied external stimulus, may be prevented by the foil from fully returning to its original shape, and may instead have a third shape (which generally may be larger than the first shape but smaller than the second shape). In its third shape, a sleeve may provide a compressive (and/or other) force against the foil to thereby hold the sleeve onto the foil. Such changes in the foil shape may be controlled by the application (and removal) of an applied external stimulus, such as by heating and then cooling. (Other intermediate shapes may also be made). The following is an example of a sleeve made from a heat-responsive, shape-memory polymer, but similar principles may be applied to a sleeve that includes another type of stimulus-responsive shape memory polymer. A heat-responsive shape-memory polymer sleeve is made that has a first glassy phase (modulus) below a glass transition temperature, $T_g$, and a rubbery phase (modulus) above a $T_g$. A sleeve is made of a shape-memory polymer in a first (original or "permanent") configuration or shape with the formation of physical crosslinks. The sleeve is subject to heating above the $T_g$, expanded and shaped to fit over a foil, and cooled while holding it in this second expanded and shaped configuration (e.g., to hold the sleeve in a temporary but stable state). After placing the sleeve on a foil, the sleeve may be changed back to its first shape (or close to its first shape as described herein) by again heating the sleeve, generally at or above the polymer's glass transition temperature, and allowing the sleeve to recover (or attempt to recover) its first shape or configuration to fit over and conform to the surface of the foil.

A shape-memory polymer sleeve may be made by methods known in the art, such as by extrusion, blow, compression, or injection molding, solution-coating, vacuum-formation, etc. A method of forming an erosion-protective sleeve may include the steps of melt-extruding a shape-memory capable polymeric material to form a sleeve; optionally applying an axial or longitudinal force to the sleeve sufficient to elongate the sleeve (e.g., up to 10%, up to 20%, up to 30%, up to 50%, up to 70%, up to 100%, etc. and/or described elsewhere herein) and cooling the sleeve while in the elongated state (to impart a temporary, but stable elongation to the sleeve); and/or optionally applying a dilatation force that imparts a dilation of the sleeve body by expanding a wall of the sleeve (e.g., by 1%-75% in a transverse dimension as described elsewhere herein) and cooling the sleeve while in the dilated state to impart a temporary but stable transverse expansion to the sleeve. The longitudinally and transversely applied forces may be applied at the same time or may be applied at different times.

A sleeve may include a shape-memory polymer such as, for example, a branched polymer, a copolyester, a copolymer, a cross-linked polymer, an ethylene-vinylacetate copolymer, a graft polymer, a polyisoprene, a polymer, a polyurethane (segmented polyurethane), a styrene-butadiene copolymer, a thermoplastic polyurethane, etc. or combinations thereof. In some examples, the body of the sleeve includes a heat-responsive shape-memory polymer and the body is configured to undergo a shape-memory change in response to heat. A shape-memory polymer sleeve may be shaped as known in the art, such as described in Lendlein and Kelch, "Shape-Memory Polymers", Angew. Chem. Int. Ed. 2002, 41, 2034-2057, which is incorporated herein by reference. A polymer may be chosen for a sleeve so that the sleeve has a desired combination of qualities, such as abrasion resistance, adhesion strength, ease of formation, ease of placement, erosion-resistance, useful $T_g$ for applying a sleeve in the field. In some examples, a shape-memory polymer in a sleeve may include a polyurethane, such as a thermoplastic polyurethane. A polyurethane in a sleeve may be a linear block copolymer and may include hard segments and soft segments. Any hard or soft segments may be used as long as the resulting sleeve can be placed over a foil shaped article and formed around the article to protect the article. A hard segment in a polyurethane sleeve as described herein may be made from (based on a unit of) an isocyanate unit, such as an aliphatic isocyanate or a linear isocyanate (4,4'-methylene bis(phenyl isocyanate (MDI), hexamethylene diisocyanate (HDI), isophorone diisocyanate (IPDI), toluene diisocyanate (TDI), etc.) and a chain extender such as, for example, ethylene glycol, 1,4-butanediol (1,4-BDO or BDO), 1,6-hexanediol, cyclohexane dimethanol, hydroquinone bis(2-hydroxytethyl ether (HQEE), etc. that may be polymerized with an isocyanate to form hard segments. A polyurethane soft segment may be made from (based on) a adipic acid, another diol, another polyol, a polyester-diol, polyester glycol, a polyester polyol, a polyether. A polyurethane may also be cross linked. In some examples, a sleeve may include a DiAPLEX polyurethane with a glass transition temperature from 25° C. to 90° C. (35° C. to 80° C., 45° C. to 75° C., etc.). Such a polymer may include a polyurethane having up to 600%, up to 500%, up to 400%, up to 300%, up to 200%, up to 100%, or up to 50% elongation in the rubbery phase and 30% to 50%, 20%-60%, etc. elongation in the glassy phase. Such a polymer may include, for example, a polyurethane with any of the characteristics shown in Table 1.

TABLE 1

| | | Pellet Type (MM) | | | | | | | | | | | | |
|---|---|---|---|---|---|---|---|---|---|---|---|---|---|---|
| | | MM (Ether Type) | | | | | | | | | | | | |
| | | 2520 | | 3520 | | 4520 | | 5520 | | 6520 | | 7520 | | 9020 | |
| Item | Unit | G | R | G | R | G | R | G | R | G | R | G | R | G | R |
| Hardness | $H_DD$ | 78 | 26 | 77 | 30 | 76 | 30 | 77 | 27 | 76 | 35 | 76 | 35 | 73 | 25 |
| 100% Modulus | MPa | | 3 | | 2.3 | | 1.4 | | 2.1 | | 1.2 | | 1.2 | | 1.2 |
| T S | MPa | 45 | 12 | 51 | 10 | 55 | 10 | 48 | 13 | 48 | 13 | 48 | 13 | 48 | 13 |
| Elongation | % | 30-50 | >600 | 30-50 | >600 | 30-50 | >600 | 30-50 | >600 | 30-50 | >600 | 30-50 | >600 | 30-50 | >600 |
| B M | MPa | 2450 | | 2450 | | 2150 | | 2150 | | 1900 | | 1900 | | 1900 | |
| B S | MPa | 90 | | 85 | | 80 | | 80 | | 50 | | 55 | | 55 | |
| S G | | 1.25 | | 1.25 | | 1.25 | | 1.25 | | 1.25 | | 1.25 | | 1.25 | |
| Tg | ° C. | 25 | | 35 | | 45 | | 55 | | 65 | | 75 | | 90 | |

Where;
G/R: Glass Region,
R/R: Rubber Region,
T S: Tensile Strength,
B M: Bending Modulus,
B S: Bending Strength
S G: Specific Gravity,
Tg: Glass Transition Temperature degree Celsius As indicated above, shape-memory polymer sleeve as described herein may be or may include a polyurethane. A shape-memory polymer useful for a sleeve may be DiAPLEX MP 5510 with a soft phase transition of 55° C. or DiAPLEX MM 7520 with a soft phase transition of 75° C. (SMP Technologies Inc./Mitsubishi Corporation/Mitsubishi Heavy Industries, Ltd.). A sleeve for protecting a foil may be made from DiAPLEX MM 7520 polyurethane resin, which may be made from diphenylmethane-4,4'-diisocyanate (CAS 101-68-8), adipic acid (CAS 124-04-9), ethylene glycol (CAS 107-21-1), ethylene oxide (CAS 75-21-8), polypropylene oxide (CAS 75-56-9), 1,4-butanediol (CAS 110-63-4), and bisphenol A (CAS-80-05-7) using manufacturing processes as known in the art. In a particular example, a shape-memory polymer sleeve may be made, for example, by melt-extruding shape-memory capable polymeric material to form a shape-memory capable sleeve.

In some variations, a sleeve may be made from a thermoplastic material, such as a thermoplastic (elastomeric) polymer and have or be configured to have a first, second, and/or third (or more than three) size and/or shape. A thermoplastic polymeric sleeve will generally include an elastomeric polymer configured to change shape in response to a change in force applied to (or removed from) the sleeve. A thermoplastic sleeve may be configured to expand up to twice its length in response to an applied force. A size or shape may be changed by applying a force or removing a force (applying a mechanical stress to the elastomeric sleeve or removing a mechanical stress from the thermoplastic sleeve). An elastomeric sleeve may have the ability to change from a first (original) shape to a second (temporary) shape and then back to (or close to) the first (original) shape. Such changes may be controlled by the application (and removal) of force, such as an expansion or deformation force (a pull or push). As indicated above, in some examples, a sleeve made from a thermoplastic polymer and held in a second (temporary) shape by an applied force may be placed on a foil, and the applied force removed to allow the sleeve to contract/shrink. However, the sleeve may be prevented by the foil from returning fully to its original shape, and may instead have a third shape. In its third shape on the foil, a sleeve may provide a compressive (and/or other) force to the foil and hold the sleeve onto the foil. A sleeve may include a thermoplastic polymer such as, for example, an aliphatic thermoplastic polyurethane, a butadiene, a branched polymer, a copolyester, a copolymer, a cross-linked polymer, a fluoropolymer, a graft polymer, a nylon, a polyacrylate, a poly-butadiene, a polycaprolactone, a polycarbonate, a polychloroprene, a polyester, a polyether, a polyisoprene, another polymer, a polyurethane (segmented polyurethane), a polyvinyl chloride, a styrene-butadiene, etc. or combinations thereof. A material for a sleeve may be chosen based on various factors, such as ease of applying the sleeve, durability, level of erosion resistance, etc. A sleeve (sleeve material) may be made in any way that allows the sleeve to be placed on a foil and provide protection. As described elsewhere herein, a sleeve may have one layer or more than one layer, and may have features, holes, etc. Various ingredients or additives such as an accelerator, anti-oxidants, a curative, a filler, a plasticizer, a scorch retarder, etc. may be used for manufacturing an elastomeric polymer to add desired qualities, such as chemical resistance, low temperature performance, strength properties, etc. An elastomeric sleeve may be made using methods as known in the art, such as, for example blow molding, compounding, extrusion, injection molding, thermoforming, etc. For example, a material for a sleeve, such a thermoplastic polyurethane (TPU) may be chosen because it is abrasion or erosion resistant, flexible at low temperatures, hard, heat resistant, high tear strength, etc. Hardness Shore A and Shore D of a material may, for example, be measured according to DIN 53505 (ISO 868). In some examples a material having a shore hardness value from 40 Shore A to 100 Shore D, 60 Shore A to 100 Shore A, from 40 Shore A to 80 Shore A, from 0 Shore D to 100 Shore D, from 60 Shore A to 70 Shore D etc. may be useful. The choice of a particular material hardness may be balanced with other sleeve features for a particular use. A harder sleeve may be more difficult to shape but may provide better protection against certain damaging forces. TPU is a highly abrasion resistant elastomeric material. In some examples, a sleeve may include an aliphatic thermoplastic polyurethane including polycaprolactone (polyester) and/or polycarbonate. In some examples, a sleeve may include an aliphatic polyurethane with a durometer hardness around 60 Shore D. A thermoplastic sleeve may include one or more of a Pearlthane polycaprolactone based polyurethane, such as Pearlthane 11T80 shore hardness of 82 A 630% elongation to Pearlthane 11T65D shore hardness of 64 D/440% elongation (Merquinsa, a Lubrizol Company, Barcelona, Spain) and/or Desmopan Range 55 A-74 D (abrasion test ISO 4649), Desmopan polycarbonate grade 790 92 A-40 D 450% elongation, Desmopan polycarbonate 795U 93-43 D 430% elongation, Desmopan polyether grade 955U 97 A-55 D 400% elongation, Desmopan polyether grade 9385 86 A-35 D 600% elongation (Bayer MaterialScience), Elastollan thermoplastic polyurethane with shore hardness values from 60 A-70 D (BASF), thermoplastic polyurethane Tecoflex (Lubrizol). In some examples, a sleeve may include an aliphatic polyurethane with a durometer hardness around 60 Shore D. In some examples, a thermoplastic sleeve may include Tecoflex (aliphatic polyurethane with a durometer hardness around 93 ShoreA).

A sleeve may have any dimensions that provides sleeve protection and does not interfere with desired foil use. A sleeve thickness may be, for example, between 0.1 mil (0.0001") to 120 mil, 0.3 mil to 30 mil, 0.1 to 10 mil, etc.

A sleeve may include or may have placed in or on it one or more additions, features, or materials, such as an additive, an adhesive a coating, a channel, a filler, a hole, etc. A sleeve as described herein may be made from one, two or more than two types of materials and may be a composite material. A sleeve may have one, or more than one (a plurality) of layers. The layers may all be the same size or an inner layer may be smaller than an outer layer, such that the outer layer completely covers the inner layer when in place on a foil. An outer layer may be attached to an inner layer or an outer layer may hold a separate inner layer or feature onto a foil with a compression force. A first material may have a second material adhered, attached or embedded in it or placed in or on it. A sleeve may include a wear resistant material such as a ceramic\(e.g., for example, an oxide, a carbide, a nitrides, etc.), a metal, a polymer, etc. A sleeve may include a radar absorbing material, a radar reflective material, another radar interference material, an infrared IR) absorbing material, an alignment indicator (e.g., for example, a colored pigment, fluorescent additive, ultraviolet (UV) additive, etc.), a wear indicator (e.g., for example, a colored pigment, a fluorescent additive, an ultraviolet (UV) additive, etc.), an electrically conductive material (e.g., for example, aluminum, carbon, silver, silicon carbide, etc.), a thermally conductive material (e.g., for example, aluminum, boron nitride, silicon carbide, etc.), a P-static (precipitation static) dissipative material, a strengthening or other fiber (e.g., for example, Kevlar® (aramid synthetic fiber; DuPont), Spectra® (ultra-high-molecular-weight polyethylene (UHMWPE); Honeywell), Zylon® (poly(p-phenylene-2,6-benzobisoxazole (PBO), Toyobo), a metal, a wire, etc. A fiber may add durability or may be configured to preferentially wear away to protect the foil. An opening (hole or channel) of a sleeve may be useful for aligning (the sleeve to the foil) or for routing wires for heating, sensing, or for a structural or lightning strike protective device. A wire, such as a copper, nichrome, or nickel wire, may be useful for heating or sensing, or as a structural or lightning strike protective device. A feature or layer may be in or on an inner layer of a sleeve, an outer layer of a sleeve, or in the middle of a sleeve.

A sleeve and/or foil may be treated or modified, such as with an adhesive (which may on an inner surface of a sleeve or between a sleeve and the foil), a coating (which may for example be on an outer surface of a sleeve, etc.) A coating may be a thin material applied in a liquid form, such as a paint, another protector, etc. Sleeve characteristics may be chosen to maintain weight balance and aerodynamic balance of foil or group of foils (such as on a rotor blade).

Figure 8A:
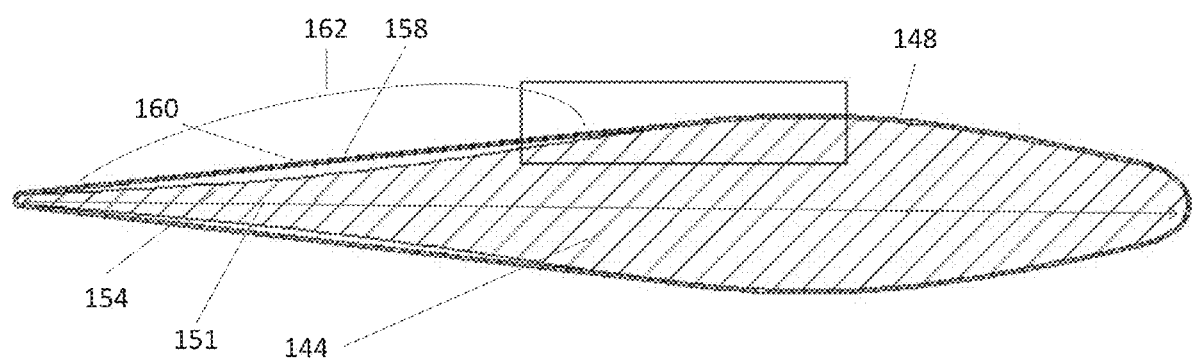
FIG. 8A shows a cross-sectional view of a protective sleeve over a rotor blade that has a concave region on its surface.
Figure 8B:
FIG. 8B shows a detail view of part of the blade shown in the box in FIG. 8A.
Figure 8C:
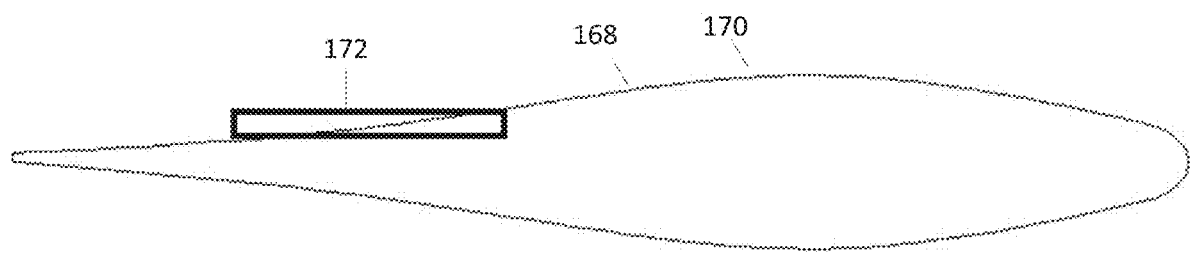
FIG. 8C shows a protective sleeve configured to fit over a concave rotor blade such as the blade shown in FIG. 8A.

Many (though not all) airfoils exhibit concave curvature. Some shapeable sleeves (e.g., some shape-memory polymer sleeves or elastomeric sleeves) may not be suitable for covering a foil exhibiting concave curvature because they may stretch tightly over the concave area. FIG. 8A shows a cross-section of sleeve 148 with a body with a materially continuous perimeter circumscribing foil 144 in a transverse dimension 151 such as described herein. FIG. 8B shows a close-up view of the section shown by the rectangular box in FIG. 8A. Foil 144 includes concave region 154 (in the region indicated by bracket 162). When a sleeve in an expanded configuration is placed over a foil and the sleeve contracted to form a contracted sleeve, a portion 158 of the sleeve (in the region indicated by bracket 162) may pull tightly and bridge across concave region 154 of foil 144, creating gap 160. In the region of a gap, a sleeve does not follow the contour of the foil. A gap between a sleeve and a foil may be undesirable and may cause problems, such as poor adherence between the sleeve and the foil. A gap may change (in an undesired way) the overall foil shape of an item that has a sleeve in place relative to the foil shape of the item alone. A gap may distort the foil shape. An aerodynamic or hydrodynamic force such as lift or drag may be altered (reduced or increased) due to the change in the foil shape. A gap may prevent a sleeve from adhering to or holding onto a blade; a frictional force or attractive force between molecules that might otherwise hold a sleeve onto the blade in the concave region may be reduced or absent and may cause the sleeve to fall off the item or otherwise be susceptible to unwanted forces. FIG. 8C shows sleeve 168 configured to for placing on an item (a foil) that has a concave region and for preventing (or reducing a size of) a gap from forming between the sleeve and the concave region of the foil. Sleeve 168 is generally configured to change size and/or shape but may have one or more portions that are configured (or handled) to not change their size or shape. These portions may not stretch/expand and may not contract. Other portions of the sleeve (e.g., portions that will coincide with predetermined areas of the foil that are not concave) are configured to expand or otherwise be in a temporarily (but stable) expanded configuration. Sleeve 168 (in an expanded configuration) is generally configured overall to contract around a foil and fit onto the foil. First portion 170 of the sleeve is generally configured to contract to fit around the foil, while second portion 172 is configured to fit onto a concave region of a foil without contracting (to prevent a gap from forming between the sleeve and the foil during sleeve placement on the foil). Second portion 172 may have a concave shape that corresponds to a concave shape of a foil. In general, second portion 172 may be configured to maintain its size and/or shape while first portion 170 contracts during sleeve placement and contraction to fit onto a foil. Surprisingly, not all areas of a sleeve body needs to be shaped (shapeable) in order to provide an interference fit of a sleeve over a foil. In some variations, while first portion 170 contracts (is configured to contract) during overall sleeve contraction, second portion 172 may not be contracted (e.g., may remain uncontracted). As described above, a sleeve that is expanded, may, prior to being expanded into its temporarily enlarged state, be equivalent or smaller than the (cross-section) of the foil it can cover.

In some variations, second portion 172 may change (be configured to change) size and/or shape, but to a greater or lesser degree than are other portions of the sleeve or may change at a different time to accommodate the concave region of the item. Second portion 172 may instead (also) have one or more focal points around which material preferentially contracts to fit second portion 172 onto a concave portion of a foil.

In some variations, a second portion of a sleeve configured to fit onto a concave region of a foil, such as portion 172, may include material having the same composition as do other portions of the sleeve, but the material may be differently configured or may be treated differently. For example, a sleeve made from a shape-memory polymer may generally be configured to change from a first configuration to a second (expanded) configuration, such as shown in FIGS. 5A-5B. During this change, sleeve first portion 170 (FIG. 8C) may expand while sleeve second portion 172 may be maintained unchanged (unexpanded) or may be contoured into a concave shape. During the contracting step (when the sleeve is contracted to fit around the sleeve), the second portion may remain unchanged (e.g., because it is already in a concave configuration). For example, although both first portion 170 and second portion 172 include a shape-memory polymer, second portion 172 may not be subject to a shape-memory change stimulus and so may not change its size or shape. Alternatively, second portion 172 may change (contract) but to a less degree than does first portion 170. For example, second portion 172 may be subject to a shape-memory change stimulus (such as described elsewhere herein or as known in the art), but it may be a weaker stimulus than applied to first portion 172. In some examples, a sleeve may include a first portion having a shape-memory polymer (such as described elsewhere herein or as known in the art) and a second portion having a non-shape-memory polymer (such as described elsewhere herein or as known in the art). A second portion may or may not change size and/or shape or may change size and/or shape to a different degree or in a different way relative to the first portion when a sleeve is being expanded and/or when a sleeve is being contracted to fit around a foil. A sleeve may include a first shape-memory portion configured to contract around a foil and a second non-shape-memory portion configured to maintain its shape when the first portion is being contracted. The shape of the second portion may be, for example, concave. Two or more materials such materials may be joined together with a seamless (or seamed) joining. In another example, a second portion in an elastomeric sleeve may include a elastomer with different properties or a different shape. For example, the second portion may be angled, curved, concave, thicker, thinner, etc. so that the second portion fits to the concave region of the foil when in position. The second portion may have a focal point(s) or focal regions (such as at an inflection point, a minimum convex function point, a maximum concave function point, etc.).

Figure 9A:
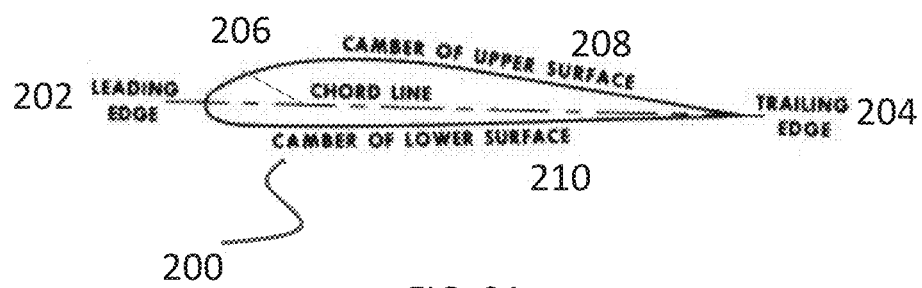
FIGS. 9A-9Y show examples of various foil shapes that a foil or a protective sleeve as described herein to protect a foil may have or may take.
Figure 9D:
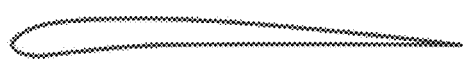
Figure 9E:
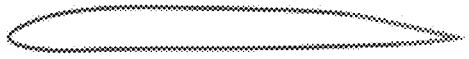
Figure 9F:
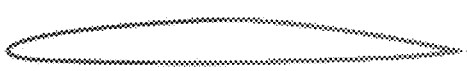
Figure 9G:
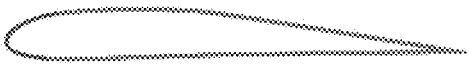
Figure 9H:
Figure 9I:
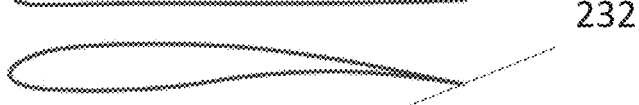
Figure 9B:
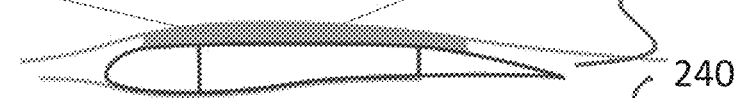
Figure 9C:
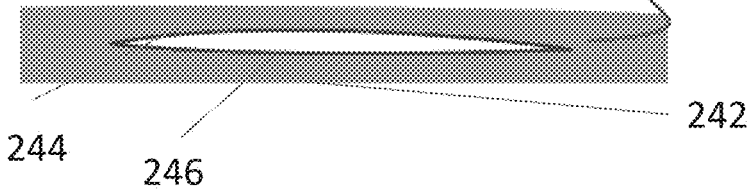
Figure 9P:
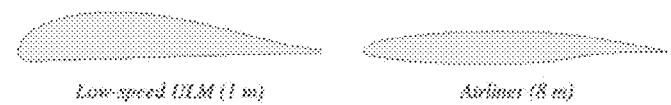
Figure 9Q:
Figure 9R:
Figure 9S:
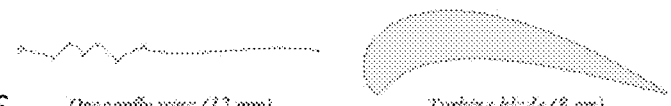
Figure 9T:

FIGS. 9A-9Y show examples of foil shapes. Foils in these or other shapes may have need of protection and may be protected using the systems, articles, materials, and methods described herein. An article to be protected herein may be a foil, a foil shaped article, or may be useful as a foil when a sleeve is placed over it. A shapeable covering or sleeve as described herein may have a foil shape or may take or be configured to take a foil shape, and may cover one of the articles described above. A sleeve may provide a foil shape to a foil or a non-foil shaped article. In general, however, a foil shaped sleeve may be useful for covering or protecting a foil shaped article. Different foils have different configurations based on the planned use of the foil and there is not one size that fits all purposes. Generally a foil has a leading edge, which is a point at the front of the airfoil that has maximum curvature and a trailing edge, which is a point of maximum curvature at the rear of the foil. A straight line, called a chord line, can be drawn that connects the leading edge and trailing edge. Most foils also show camber, which is the asymmetry between the top and bottom surfaces of the foil, although some foils may be symmetric and not be cambered. A sleeve may be continuous around the leading edge, the upper surface, the trailing edge, and the lower surface and may be shaped to cover (fit to) the camber. FIG. 9A shows foil 200 with leading edge 202 and trailing edge 204. Chord line 206 connects leading edge 202 and trailing edge 204 and may be useful for describing characteristics of a foil. Foil 200 is cambered and has an upper surface camber 208 and a lower surface camber 210 which is different from upper surface camber 208. The foil camber may determine how a foil moves through a media, such as air. FIG. 9B shows foil 230 with media 232 movement strongly and predominantly along upper surface 234. FIG. 9C shows foil 240 with media 242 movement along upper surface 244 and lower surface 246. Foil shapes have changed over time as understanding of aerodynamics and fluid dynamics evolved. For example, early airfoils had a concave lower surface, such as shown in FIG. 9J, and produced great lift. Such airfoils, however, lost speed while producing lift and other designs were better for high speed flight, such as those shown in FIGS. 9K-9O. More recently, airfoils having a concave surface have found favor again to take advantage of the high lift provided by the concave surface. For example, some airfoils are used in conjunction with leading edge (Kreuger) flaps or trailing edge (Fowler) flaps to change the airfoil into a concave shape to provide high lift. In general, a foil is a body configured to or able to provide a desired reaction force when in motion relative to a surrounding media (e.g., aqueous solution, air, gel, water etc.). An airfoil or hydrofoil is generally a shaped surface that produces a lifting force ("lift") that acts at right angles to an airstream or water stream and a dragging force ("drag") that acts in the same direction as the airstream or water stream when moved relative to the airstream. A high-speed aircraft often employ thin, low-drag, low-lift airfoils; slow aircraft may often use thicker airfoils with high drag and high lift. An airfoil may be found for example, on an airplane, a bird, a boat (e.g., a sailboat) a glider, a helicopter, a toy, a wind turbine, etc. and may include a blade, a propeller, a tail, a wing, etc. A hydrofoil may be found, for example, on a bird (e.g., a diving bird), a boat, a fish, another water craft, etc. and may include a diving plane, a fin, a flipper, a keel, a propeller, a rudder, a toy, a tail, a wing, etc. Generally, a foil is moved past a media, but a media may also be moved past a foil (such as in a wind tunnel). In some examples, a foil may have a wing-like curvilinear foil shape or a double wedge foil shape.

As indicated above, a sleeve as described herein may have a longitudinal dimension and a transverse dimension and may cover or be configured to cover a length of a foil and may circumscribe or be configured to circumscribe a foil about its transverse dimension. A sleeve to cover a foil and/or provide a foil shape to an object may have any longitudinal and transverse dimension shapes and sizes.

A sleeve may cover or be configured to cover part or all of any helicopter (main or tail) rotor blade. The following are non-limiting examples of helicopter blades that may be covered or protected by a sleeve or for which a sleeve may be adapted and configured to cover or protect. Such a blade may be, for example, a high aspect ratio airfoil. It may be up to about 40 feet long, may have up to a 30 inch chord, may be 1-3 inches thick, may have a 'swept' tip, and/or may have a twist (e.g., the airfoil cross-section may change pitch along the blade). Table 2 shows examples of dimensions that some sleeves may have or may take, such a sleeve that is on or configured and adapted to be placed on a helicopter blade.

TABLE 2

| Sleeve geometry | Min | Max | Units | Example |
|---|---|---|---|---|
| Length | 0.1 | 100 | Feet | |
| | 1 | 50 | | |
| | 2 | 25 | | |
| Wall Thickness | 0.1 | 120 | Mil (0.001 in) | |
| | 0.2 | 60 | | |
| | 0.3 | 40 | | |
| Perimeter | 3.14 | 100 | inches | |
| | 6.26 | 85 | inches | |
| | 15 | 70 | inches | |
| Ratio of Length to perimeter | 1:1 | 10:1 | | 12" length:12" perimeter-120" length:12" perimeter |
| | 2:1 | 9:1 | | 24" length:12" perimeter-108" length:12" perimeter |
| | 3:1 | 8:1 | | 36" length:12" perimeter-96" length:12" perimeter |

Figures 10A, 10B:
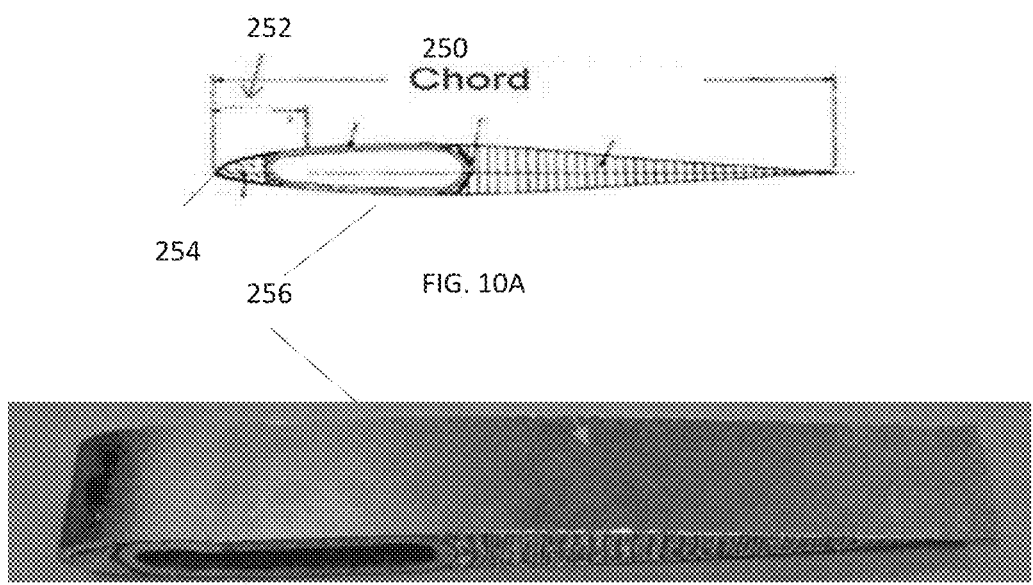
FIGS. 10A-10B show a view of a rotor that a protective sleeve as described herein may protect.

FIGS. 10A-10B shows perspective cross-section views of foil 256 that may be circumscribed by a sleeve. In one example, a chord length 250 of the foil is about 20.76". A portion of a sleeve may be thicker around leading edge 254 to protect the leading edge. In some examples, a sleeve as described herein may cover or be adapted to cover and circumscribe a UH-60 Black Hawk rotor blade such as, for example, having radius of about 322 inches, a nominal chord of about 20.76 inches, a rectangular blade planform with a swept tip and non-linear twist. In some examples, a sleeve as described herein may cover or be adapted and configured to withstand an operating speed of about 258 rpm, resulting in a hovertip Mach number of about 0.65. Such a helicopter may have a 53.8' rotor diameter with 4 blades (21" chord) and carry or be configured to carry, for example, 3 crew members and 11 passengers. In some examples, a sleeve as described herein may cover or be adapted and configured to cover a Sikorsky UH-60 Black Hawk rotor blade, such as, for example, with a chord of 20.76 inches and a perimeter of 42-50 inches. In some examples, a sleeve as described herein may be configured to cover a Sikorsky S-64 or S-64F Skycrane rotor blade, such as, for example, with a chord length of about 2.167 feet or 26 inches. Such a helicopter may have a 72.3' rotor diameter with 7 blades (26" chord).

In some examples, a sleeve as described herein may cover or be adapted and configured to cover a CH-53E rotor blade, such as, for example, with a chord of 0.76 meters or 29.92 inches and a perimeter of 60-70 inches. Such a helicopter may have a 79' rotor diameter with 30" chord. In some examples, a sleeve as described herein may cover or be adapted and configured to cover a Robinson R22 rotor blade. A diameter of two blades connected by a hub may be approximately 26 feet, and each with a chord of 7.2" and having an −8 degree twist.

A sleeve, especially a helicopter sleeve, as described herein may be configured to last at least 100 hours, at least 500 hours, at least 1000 hours, at least 1500 hours, or at least 2000 hours without failing during use (falling off or causing sufficient vibration that prevents desired or normal use) and/or during use/exposure to sand. A blade protected by a sleeve may last at least 100 hours, at least 450 hours, at least 500 hours, at least 1000 hours, least 1500 hours, or at least 2000 hours without failing during use and/or during use/exposure to sand. For example, the U.S. Army may require a blade to last at least 450 hours over sand. A sleeve may be placed on a foil during blade manufacture or after manufacture, and may be replaced one, two, or three, or more than three times. A sleeve may be replaced in the field or may be replaced at a special depot. A sleeve may be placed on a foil when the foil is separated from an object for which it can serve as a foil or can be placed while the foil is attached to the object. For example, a sleeve may be placed on a rotor blade while the blade is attached to a helicopter or may be placed on a rotor blade that is not attached to a helicopter.

As for additional details pertinent to the present invention, materials and manufacturing techniques may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed is:

1. An airfoil or hydrofoil erosion-resistant sleeve for protecting a foil, the foil comprising an airfoil or hydrofoil having a first foil shape, the sleeve comprising: a body adapted to cover at least a portion of the foil, the body comprising an outer surface and an inner surface and a sleeve thickness therebetween and having a longitudinal dimension with a first end and a second end and a dimension transverse to the longitudinal dimension, the outer surface comprising a shape memory polymer or an elastomeric polymer with a materially continuous perimeter circumscribing the body around the transverse dimension and having a second foil shape, the inner surface comprising a third foil shape that has the same shape as at least a portion of the first foil shape; and an opening at the first end of the body adapted to receive the foil wherein a transverse segment of the body is adapted to undergo a contraction in the transverse dimension to conform the third foil shape to the portion of the first foil shape.

2. The sleeve of claim 1 wherein the first foil shape comprises a wing-like curvilinear foil shape or a double wedge foil shape.

3. The sleeve of claim 1 wherein the body is seamless.

4. The sleeve of claim 1 wherein the body further comprises an opening at a second end.

5. The sleeve of claim 1 wherein the body comprises a concave portion.

6. The sleeve of claim 5 wherein the concave portion comprises a non-shape memory material.

7. The sleeve of claim 1 wherein the first foil shape and the second foil shape are substantially the same.

8. The sleeve of claim 1 wherein the first foil shape and the second foil shape are different.

9. The sleeve of claim 1 wherein the first foil shape and third foil shape are substantially the same.

10. The sleeve of claim 1 wherein the third foil shape is adapted and configured to provide a lift force when the sleeve covers the foil and the foil moves relative to an air or water current.

11. The sleeve of claim 1 wherein the foil comprises a leading edge and a trailing edge and the sleeve is adapted to surround and cover the foil at a portion of the leading edge, a portion of the trailing edge, and an area between the edges.

12. The sleeve of claim 1 wherein the thickness varies from a first portion of the body to a second portion of the body.

13. The sleeve of claim 12 wherein the foil includes a rounded leading edge at the front of the foil and a trailing edge at the rear of the foil wherein the thickness is greater at the first portion corresponding to the rounded leading edge.

14. The sleeve of claim 1 wherein the foil and the inner surface of the body are substantially the same size.

15. The sleeve of claim 1 wherein the third foil shape is smaller than the first foil shape, the sleeve being further adapted to be expanded or stretched to fit over the foil.

16. The sleeve of claim 1 wherein the transverse segment of the body is adapted to undergo an expansion change from about 1% to about 75% in the transverse dimension.

17. The sleeve of claim 1 wherein the transverse segment of the body is adapted to undergo an expansion change to provide between 0.010" and 0.25" of clearance between the inner surface of the body and the foil.

18. The sleeve of claim 1 wherein the transverse segment of the body is adapted to undergo a contraction change from about 1% to about 75% in the transverse dimension.

19. The sleeve of claim 1 wherein the transverse segment of the sleeve is adapted to undergo a contraction change to remove between 0.010" and 0.25" of clearance between the inner surface of the body and the foil when the sleeve is in place over the foil.

20. The sleeve of claim 1 wherein the transverse segment of the body is adapted to undergo an expansion change in response to an expansion force to provide clearance between the inner surface of the sleeve and an outer surface of the foil, and to contract when the force is removed and thereby deliver a compressive force over the surface of the foil when the sleeve is in place over the foil.

21. The sleeve of claim 1 wherein the transverse segment of the body is adapted to contract in response to an applied stimulus.

\* \* \* \* \*